United States Patent
Benhase et al.

(10) Patent No.: US 9,785,553 B2
(45) Date of Patent: *Oct. 10, 2017

(54) ASYNCHRONOUS CLEANUP AFTER A PEER-TO-PEER REMOTE COPY (PPRC) TERMINATE RELATIONSHIP OPERATION

(71) Applicant: INTERNATIONAL BUSINESS MACHINES CORPORATION, Armonk, NY (US)

(72) Inventors: Michael T. Benhase, Tucson, AZ (US); Lokesh M. Gupta, Tucson, AZ (US); Warren K. Stanley, Loveland, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,316

(22) Filed: Feb. 9, 2017

(65) Prior Publication Data
US 2017/0153976 A1    Jun. 1, 2017

Related U.S. Application Data

(63) Continuation of application No. 14/186,538, filed on Feb. 21, 2014, now Pat. No. 9,600,277.

(51) Int. Cl.
| | |
|---|---|
| G06F 12/08 | (2016.01) |
| G06F 3/06 | (2006.01) |
| G06F 9/48 | (2006.01) |
| G06F 12/0804 | (2016.01) |
| G06F 12/0875 | (2016.01) |

(52) U.S. Cl.
CPC .......... *G06F 12/0804* (2013.01); *G06F 3/065* (2013.01); *G06F 3/067* (2013.01); *G06F 3/0608* (2013.01); *G06F 3/0652* (2013.01); *G06F 9/4843* (2013.01); *G06F 12/0875* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 6,128,704 | A | 10/2000 | Jun |
| 6,163,839 | A | 12/2000 | Janik et al. |
| 6,247,115 | B1 | 6/2001 | Janik et al. |
| 6,351,805 | B2 | 2/2002 | Janik et al. |

(Continued)

OTHER PUBLICATIONS

Benhase et al., "Track Promotion/Demotion to a Cache Store," IPCOM000100386D, IP.com, Mar. 15, 2005 (2 pages).

(Continued)

*Primary Examiner* — Christopher D Birkhimer
(74) *Attorney, Agent, or Firm* — Griffiths & Seaton PLLC

(57) ABSTRACT

For asynchronous cleanup after a peer-to-peer remote copy (PPRC) terminate relationship operation in a computing storage environment by a processor device, asynchronously cleaning up a plurality of PPRC modified sectors bitmaps using a PPRC terminate-relationship cleanup operation by throttling a number of tasks performing the PPRC terminate-relationship cleanup operation, and terminating the PPRC relationship by calling a cache to perform a terminate cleanup bind segment scan operation on a plurality of bind segments.

20 Claims, 15 Drawing Sheets

(56) References Cited

U.S. PATENT DOCUMENTS

| | | |
|---|---|---|
| 6,957,210 B1 | 10/2005 | Ramesh |
| 6,957,222 B1 | 10/2005 | Ramesh |
| 7,020,653 B2 | 3/2006 | Idicula et al. |
| 7,024,530 B2 | 4/2006 | Jarvis et al. |
| 7,047,374 B2 | 5/2006 | Sah et al. |
| 7,092,954 B1 | 8/2006 | Ramesh |
| 7,885,932 B2 | 2/2011 | Kulkarni et al. |
| 7,996,592 B2 | 8/2011 | Kim et al. |
| 8,214,331 B2 | 7/2012 | Kulkarni et al. |
| 8,489,553 B2 | 7/2013 | Kulkarni et al. |
| 8,527,974 B2 | 9/2013 | Ayguade et al. |
| 8,561,043 B2 | 10/2013 | Ayguade et al. |
| 8,561,044 B2 | 10/2013 | Chen et al. |
| 8,607,024 B2 | 12/2013 | Yasufuku et al. |
| 2004/0181639 A1 | 9/2004 | Jarvis et al. |
| 2008/0120482 A1 | 5/2008 | Jarvis et al. |
| 2010/0169274 A1 | 7/2010 | Kulkarni et al. |
| 2011/0196844 A1 | 8/2011 | Kulkarni et al. |
| 2012/0271862 A1 | 10/2012 | Kulkarni et al. |
| 2012/0324171 A1 | 12/2012 | Benhase et al. |
| 2014/0025685 A1 | 1/2014 | Kulkarni et al. |
| 2014/0223081 A1 | 8/2014 | Brown et al. |
| 2014/0223121 A1 | 8/2014 | Brown et al. |

OTHER PUBLICATIONS

Beardsley et al., "Direct Access Storage Device Cache Segment Management," IPCOM000113445D, IP.com, Mar. 27, 2005 (7 pages).

Handy, "The Cache Memory Book: The Authoritative Reference on Cache Design," Second Edition, 1998 (8 pages).

Lin, "Set Associative Cache," https://web.archive.org/web/20051203182636/http://www.cs.umd.edu/class/sum2003/cmsc311/Notes/Memory/set.html, Dec. 3, 2005 (2 pages).

ASYNCHRONOUS CLEANUP AFTER A PEER-TO-PEER REMOTE COPY (PPRC) TERMINATE RELATIONSHIP OPERATION

CROSS REFERENCE TO RELATED APPLICATIONS

This Application is a Continuation of U.S. patent application Ser. No. 14/186,538, filed on Feb. 21, 2014.

BACKGROUND OF THE INVENTION

Field of the Invention

The present invention relates in general computing systems, and more particularly to, systems and methods for asynchronous cleanup after a peer-to-peer remote copy (PPRC) terminate relationship operation.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage storage tracks from cache to long-term storage devices so that there is sufficient room in the cache for data to be written. When destaging the storage tracks, contemporary storage systems destage the storage tracks from each rank in the cache when the cache is becoming full or the global pressure factor is high. That is, storage tracks are destaged from each rank when the global pressure factor is high, even though some ranks in the cache may only be storing a small number of storage tracks with respect to the amount of storage space allocated to these ranks. Moreover, destaging tasks assist with starting the destaging of storage tracks to the storage systems. Also, disasters caused by environmental conditions, user errors, or application errors may occur in which access to the data is lost for some period of time. Mirroring or copying data to a secondary storage system from a primary storage system is currently employed to minimize the time in which access to data is lost due to a disaster. Efficiently destaging, storing, and/or mirroring data to a secondary storage system from a primary storage system is a key problem to solve, and therefore, a need exists to improve the destaging, storage, and management of data in a data storage system.

SUMMARY OF THE INVENTION

In one embodiment, a method is provided for asynchronous cleanup after a peer-to-peer remote copy (PPRC) terminate relationship operation by a processor device in a computing storage environment. In one embodiment, by way of example only, the method comprises asynchronously cleaning up a plurality of PPRC modified sectors bitmaps associated with a volume corresponding to a PPRC relationship by throttling a number of tasks performing the cleaning up subsequent to a PPRC terminate-relationship operation; and terminating the PPRC relationship by calling a cache to perform a terminate cleanup bind segment scan operation on a plurality of bind segments.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
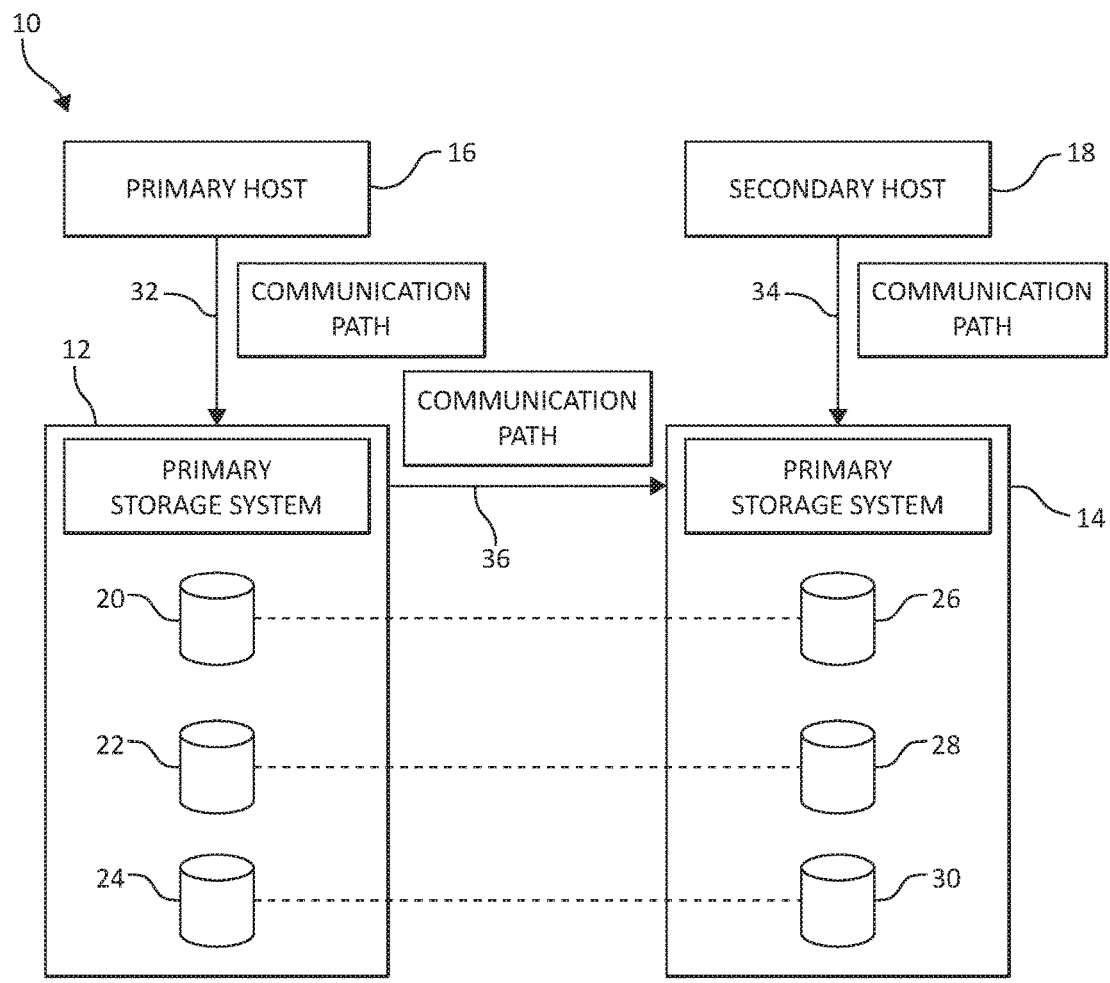
FIG. 1 illustrates is a block diagram showing an exemplary hardware structure for a peer-to-peer remote copy (PPRC) system in which aspects of the present invention may be realized.

With increasingly large amounts of data being handled in data processing systems, storage systems, such as disk storage systems are being used to store data. Some organizations rely heavily on data and quick access to the data. Disasters caused by environmental conditions, user errors, or application errors may occur in which access to the data is lost for some period of time. Mirroring or copying data to a secondary storage system from a primary storage system is currently employed to minimize the time in which access to data is lost due to a disaster. A peer remote copy (PPRC) system is a hardware-based disaster recovery solution designed to maintain a mirror image of application data at a remote secondary location. The PPRC system is a synchronous copy mechanism that creates a copy of data at a remote or secondary storage system. This copy, at the secondary storage system, is kept current with the data located at the primary storage system. Particularly, key to PPRC, is the migration of data sets from mass storage devices, such as hard disk drives or other data storage media, to another set with a minimum of disruption to the applications using the data. Particularly, PPRC mechanisms automatically copy changes that are made to a source (primary) volume to a target (secondary) volume until the PPRC relationship is suspended or terminated. In other words, a copy of the data located at the secondary storage system is kept in sync with the data at the primary storage system as observed by the user of the data. Volume pairs are designated in which a volume in the primary storage system is paired with a volume in the secondary storage system.

With a PPRC system, a PPRC data copy to the recovery or secondary storage system occurs synchronously from the primary host point of view with write operations to volumes in the primary storage system. Paths connect the primary storage system to the secondary storage system. When data is written from a primary host to the primary storage system, the data written to a primary volume is also written by the primary storage system to a corresponding volume in the secondary storage system using a path to the secondary storage system.

In effect, the primary volume data is replicated to a corresponding secondary volume and the two volumes are kept in sync when writes are sent to the primary volume. It is the responsibility of the primary storage system to send all primary volume writes to the corresponding secondary volume of the secondary storage system. It is the responsibility of the secondary storage system to disallow any read or write accesses by any hosts to the secondary volume while the secondary volume is dedicated as secondary storage. These actions keep the content of the primary and secondary volumes identical.

Certain data storage architectures, such as the IBM® System Storage™ DS8000™ "DS8K" series, may only support only one PPRC target for a PPRC primary volume. For every track that needs to be synchronized to the secondary storage system, a PPRC primary storage system keeps tracks of modified sectors in the track that need to be transferred to the secondary storage system. PPRC stores modified sectors for a track that need to be transferred in a cache control block (e.g., a cache segment control block "CSCB"). Modified sectors are stored as a bitmap, which take 16 bytes in a CSCB (e.g., 128 sectors per track/8 bits per byte=16 bytes).

A track in cache has at least two control blocks associated with the track. One of the control blocks is cache directory control block (CDCB) and another is primary CSCB. If the cache track has more than two segments, then there may be additional CSCBs. For example, if a cache track has 3 segments then the cache tracks have a CDCB and two CSCBs. Both CDCB and CSCB are 256 bytes and a segment is 4 kilobytes (KB). So for each 4 KB space in cache, there is at least an overhead of 256 bytes. A cache track has at least two segments allocated. So the overhead is more when data is needed for only 1 segment. It is critical to keep overhead associated with the control blocks for cache segments to be low allowing more memory to be used for caching customer data thereby improving cache performance by improving hits in cache.

With multi-target PPRC, a PPRC primary may have up to 3 targets. A primary may need to store as many as three PPRC modified sector bitmaps—one for each PPRC relationship (relation). As a result, one PPRC modified sector bitmap in a CSCB is insufficient. To increase the number of PPRC modified sectors to three would take 32 additional bytes in CSCB, and the space in CSCB will always be taken for every track in cache even when there are no PPRC relations on the volume for a track. It is not suitable to simply add 2 more bitmaps to the CSCB. Also, in the future, there may be a need to support more PPRC targets that require even more space in the CSCB. Therefore, a need exists for efficient cache management of multi-target peer-to-peer remote copy (PPRC) modified sectors bitmap in a computing storage environment. In one embodiment, by way of example only, a multiplicity of PPRC modified sectors bitmaps are dynamically managed by placing the multiplicity of PPRC modified sectors bitmaps into slots of bind segments. A cache will dynamically manage PPRC modified sectors bitmap in bind segments.

Moreover, when a PPRC primary storage system writes a track, the PPRC primary storage system may write the entire track or just some sectors in the track. When the entire track is written, PPRC modified sector bitmap becomes less useful since the entire track needs to be transferred to secondary storage system. If the track is only partially written then the PPRC modified sector bitmap contains modified sectors and becomes more useful in that only those sectors need to be transferred to secondary and hence we save on bandwidth.

One solution in the current state of the art is for the PPRC modified sector bitmap to be kept in the track control block. However, if the track is demoted before being transferred to the secondary storage system then the modified sector bitmap is lost. This means that a full track is required to be transferred to the secondary storage system after a track is demoted out of cache. To address this challenge, as described herein, a solution is provided for optimizing peer-to-peer remote copy (PPRC) transfers for partial write operations in a computing storage environment by a processor device. The PPRC modified sector bitmap is kept/maintained in bind segments separate from the track control block. Thus, when a track is demoted out of cache, the track's PPRC modified sector bitmap may still be kept and maintained. After a track is demoted out of cache, the PPRC transfer can still transfer a partial track saving bandwidth. The PPRC transfers do not transfer entire tracks to the secondary, but rather, transfer only the modified sectors when appropriate. When there is no PPRC on a volume, overhead for cache space is minimal.

In other words, the PPRC modified sectors bitmap is maintained in bind segments upon demoting a track out of a cache for transferring a partial track after the demoting the track. A hash table is used for locating the PPRC modified sectors bitmap. The optimizing peer-to-peer remote copy (PPRC) transfers for partial write operations performs the following steps 1) maintains/keeps the PPRC modified sectors bitmap even after a track is demoted out of cache, 2) uses a hash table for fast look up of the PPRC modified sectors bitmap, and 3) transfers a partial track even after a track is demoted out of cache.

When a PPRC relationship is terminated, all the PPRC modified sector bitmaps for the volume corresponding to that relationship need to be cleaned up. Currently, there are several problems with PPRC terminate such as 1) the cleaning up operation may hold the terminate operation for several seconds, and 2) there may be a multiplicity of terminate PPRC relationship operations simultaneously occurring (e.g., several thousands of terminate PPRC relationship operations), which consumes the systems entire resources. As such, a need exists to asynchronously cleanup slots and bind segments on a PPRC terminate without impacting PPRC terminate times. In one embodiment, the present invention 1) asynchronously performs the cleanup operation of bitmaps for PPRC terminate relationship operations, 2) throttles a number of tasks that do the PPRC terminate relationship operations (e.g., "terminates"), and 3) holds any PPRC establish-relationship operations ("establishes") before a PPRC terminate relationship operation is completed for that particular relation. A queue of terminates is maintained and used. The terminate PPRC relationship operations are asynchronously processed. The number of tasks doing the processing for terminates are throttled. Bind segments are released on the terminate PPRC relationship operation whenever possible. A PPRC establish-relationship operation is held until a terminate PPRC relationship operation is complete.

Additionally, there is a current need for managing free space of multi-target PPRC modified sectors bitmaps in cache bind segments such that there is 1) no churn in allocation and freeing of bind segments, 2) it is fast and efficient to allocate and deallocate a slot in bind segment, and 3) keeping usage of bind segments to a minimum for reducing the usage of so as cache space for bind segments. Thus, for efficient free-space management of multi-target peer-to-peer remote copy (PPRC) modified sectors bitmap in bind segments, a list of bind segments having a multiplicity of free slots is maintained for each storage volume. Each one of the bind segments includes a bitmap of the multiplicity of free slots. Those of the bind segments having more than a predetermined number of the multiplicity of free slots are freed (e.g., released).

For each volume, a list of bind segments with free slots is maintained and updated. Each bind segment has a bitmap of the free slots. The bind segments are not freed if less than an nth number of free slots (e.g., a predetermined number/threshold of free slots). On a PPRC terminate (e.g., PPRC terminate relationship operation), the bitmap is zeroed out for the relationship in all slots and the slots are freed if all bitmaps are zero. On a cache demote, the slot is freed for all PPRC relations.

Turning to FIG. 1, a block diagram of one embodiment of a system 10 for FIG. 1 for a peer-to-peer remote copy (PPRC) system in which aspects of the present invention may be realized. At least in the illustrated embodiment, peer remote copy (PPRC) system 10 is shown. PPRC system 10 includes a primary storage system 12 and a secondary storage system 14. PPRC system further includes a primary host 16 connected to primary storage system 12 and a secondary host 18 connected to secondary storage system 14. Primary host 16 stores data in primary storage system 12. Data written to primary storage system 12 is copied to secondary storage system 14. The copy process creates a copy of the data from primary storage system 12 into secondary storage system 14. The copy process is a PPRC mechanism. In PPRC system 10, a write made by primary host 16 is considered complete only after the data written to primary storage system 12 also is written to secondary storage system 14. Primary and secondary hosts 16 and 18 may take various forms, such as a server on a network, a Web server on the Internet, or a mainframe computer. Primary storage system 12 and secondary storage system 14 are disk systems in these examples.

A communication path 32 connects primary host 16 to primary storage system 12. A communication path 34 connects secondary host 18 to secondary storage system 14. A communication path 36 connects primary storage system 12 with secondary storage system 14. Communication paths 32, 34, and 36 may take various forms, such as, for example, a local area network (LAN), a wide area network (WAN), the Internet, or an intranet. Communication paths 32, 34, and 36 contain various links, such as, for example, fiber optic lines, packet switched communication links, enterprise systems connection (ESCON) fibers, small computer system interface (SCSI) cable, and wireless communication links.

PPRC system 10 is an example of a data processing system in which the present invention may be implemented and not as an architectural limitation to the present invention. For example, primary host 16 and primary storage system 12 may be connected directly while primary storage system 12 and secondary storage system 14 may be connected by a LAN or a WAN. Further, primary storage system 12 and secondary storage system 14 may be connected to each other by a network rather than a direct connection.

Primary storage system 12 includes a set of storage volumes 20, 22, and 24. Secondary storage system 14 includes a set of storage volumes 26, 28, and 30. Secondary storage volumes 26, 28, and 30 correspond to primary storage volumes 20, 22, and 24. The correspondence between the volumes in primary and secondary storage systems 12 and 14 is set up in PPRC pairs, such that a storage volume in primary storage system 12 has a corresponding storage volume in secondary storage system 14. For instance, primary volume 20 is paired with secondary volume 26, primary volume 22 is paired with secondary volume 28, and primary volume 24 is paired with secondary volume 30. These pairs are referred to as established PPRC pairs.

In operation, primary storage system 12 sends data over communication path 36 to secondary storage system 14 each time data is written to a primary storage volume by primary host 16. Secondary storage system 14 then copies the data to the secondary storage volume corresponding to the primary storage volume. For example, if data is written to primary storage volume 20 then the data is copied to the corresponding secondary storage volume 26. Similarly, if data is written to primary storage volume 22 then the data is copied to the corresponding secondary storage volume 28.

Figure 2:
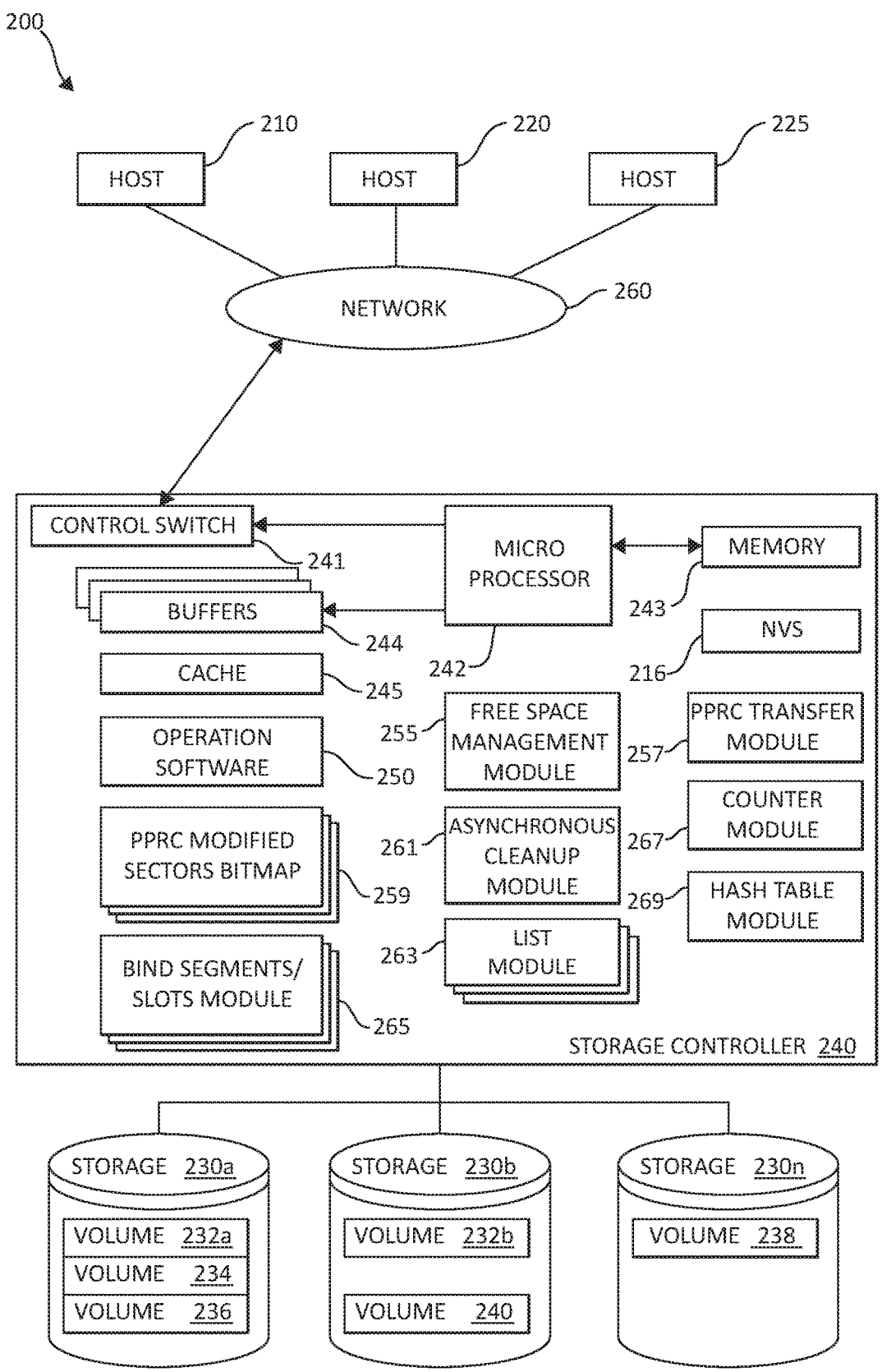
FIG. 2 is a block diagram showing an exemplary hardware structure of a data storage system in a computer system according to the present invention in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230. In one embodiment, the embodiments described herein may be applicable to a variety of types of computing architectures, such as in a virtual cluster management environment using the various embodiments as described herein.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a free space management module 255, a PPRC transfer module 257, a PPRC modified sectors bitmap module 259, an asynchronous cleanup module 261, list(s) module 263, bind segment(s)/slot(s) module 265, a counter module 267, and a hash table module 269. The free space management module 255, the PPRC transfer module 257, the PPRC modified sectors bitmap module 259, the asynchronous cleanup module 261, the list(s) module 263, the bind segments/slot(s) module 265, the counter module 267, and the hash table module 269 may be one complete module functioning simultaneously or separate modules. The free space management module 255, the PPRC transfer module 257, the PPRC modified sectors bitmap module 259, the asynchronous cleanup module 261, the list(s) module 263, the bind segments/slot(s) module 265, the counter module 267, and the hash table module 269 may have some internal memory (not shown) and may store unprocessed, processed, or "semi-processed" data. The free space management module 255, the PPRC transfer module 257, the PPRC modified sectors bitmap module 259, the asynchronous cleanup module 261, the list(s) module 263, the bind segments/slot(s) module 265, the counter module 267, and the hash table module 269 may work in conjunction with each and every component of the storage controller 240, the hosts 210, 220, 225, and other storage controllers 240 and hosts 210, 220, and 225 that may be remotely connected via the storage fabric 260. Both the free space management module 255, the PPRC transfer module 257, the PPRC modified sectors bitmap module 259, the asynchronous cleanup module 261, the list(s) module 263, the bind segments/slot(s) module 265, the counter module 267, and the hash table module 269 may be structurally one complete module or may be associated and/or included with other individual modules. The free space management module 255, the PPRC transfer module 257, the PPRC modified sectors bitmap module 259, the asynchronous cleanup module 261, the list(s) module 263, the bind segments/slot(s) module 265, the counter module 267, and the hash table module 269 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the free space management module 255, the PPRC transfer module 257, the PPRC modified sectors bitmap module 259, the asynchronous cleanup module 261, the list(s) module 263, the bind segments/slot(s) module 265, the counter module 267, and the hash table module 269 in which information may be set. Multiple buffers 244 may be implemented to assist with the methods and steps as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, the free space management module 255, the PPRC transfer module 257, the PPRC modified sectors bitmap module 259, the asynchronous cleanup module 261, the list(s) module 263, the bind segments/slot(s) module 265, the counter module 267, and the hash table module 269 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
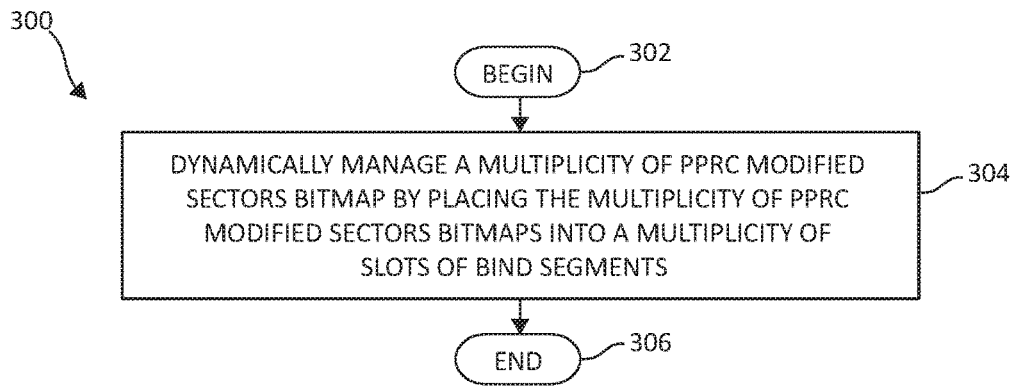
FIG. 3 is a flowchart illustrating an exemplary method for efficient cache management of multi-target peer-to-peer remote copy (PPRC) modified sectors bitmap in which aspects of the present invention may be realized.

Turning to FIG. 3, a flowchart illustrating an exemplary method 300 for efficient cache management of multi-target peer-to-peer remote copy (PPRC) modified sectors bitmap is depicted. The method 300 begins (step 302). The method 300 dynamically manages a multiplicity of PPRC modified sectors bitmap by placing the multiplicity of PPRC modified sectors bitmaps into a multiplicity of slots of bind segments (step 304). The method 300 ends (step 306). For efficient cache management of multi-target peer-to-peer remote copy (PPRC) modified sectors bitmap, the architectural data structure may include at least 1) bind segments, 2) a PPRC Bind Segments Control Block (PBS DevCB or PPRC Bind Segments CB), 3) cache control block for a track, and/or 4) slot information for slots. The architectural data structure may also include additional components, such as a cache, as needed.

In one embodiment, in a data storage system having demotion of data from cache with some bind files that are retained in cache, the present invention places multiple ones of bit maps (the bit maps relating to copying data to a secondary entity) to slots of bind files/segments, and dynamically managing the bit maps and slots separately from the data management. A cache will dynamically manage PPRC modified sectors bitmap in bind segments. A bind segment is a 4 KB block of Cache memory.

Figure 4:
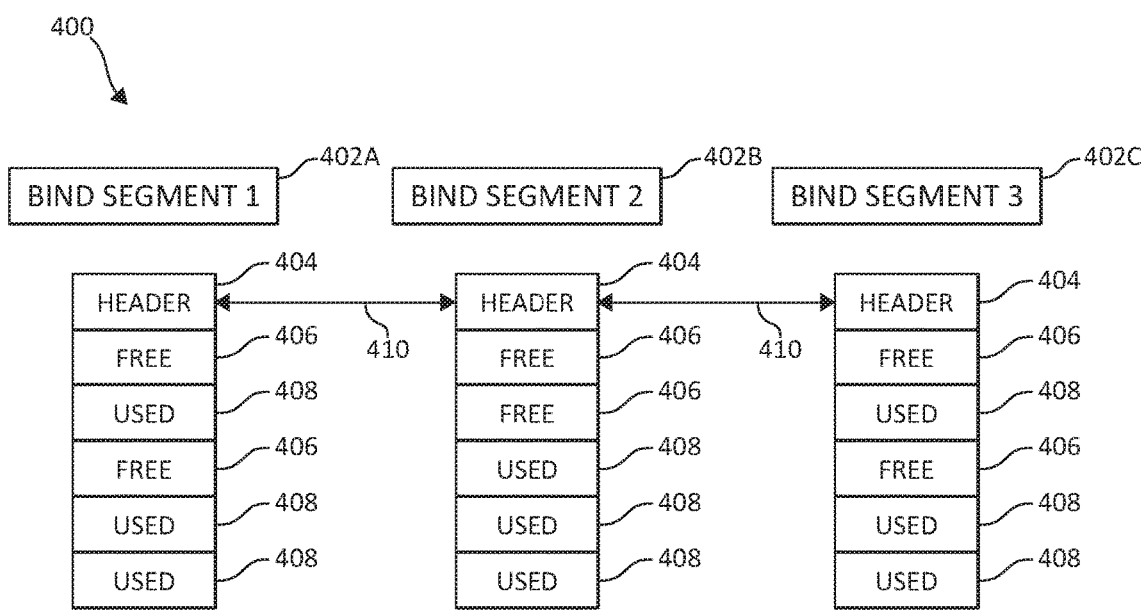
FIG. 4 is a block diagram showing an exemplary structure of a linked list of bind segments of free slots in which aspects of the present invention may be realized.

Turning now to FIG. 4, a block diagram 400 showing an exemplary structure of a linked list of bind segments of free slots is depicted. In one embodiment, cache will use bind segments 402 (402A-C) to store PPRC modified sectors bitmap as needed. Each bind segment 402 has a header 404 and a certain fixed number of slots 406 and 408 (406 showing the free slots and 408 showing the used slots) to store PPRC modified sector bitmaps. The slots 406 and 408 are grouped together to reduce the overhead of map and unmap of the bind segments 402.

The header 404 contains the following information: 1) the number of used slots 408 for PPRC modified sector bitmaps, 2) a bitmap of free slots 406, 3) a pointer 410 to the next and previous bind segment 402 (e.g., 402C may be the next bind segment and 402A may be the previous bind segment as they relate to bind segment 402B, but this order may also be reversed depending on architectural and/or user preference, 4) a pointer 410 to the next and previous Bind Segment with free slots, and 5) a longitudinal redundancy check (LRC).

In one embodiment, a PPRC Bind Segments Control Block (PBS DevCB or PPRC Bind Segments CB) is used and for every storage volume. A PPRC Bind Segments CB contains the following. First, a bind segments list used for PPRC modified sectors bitmap for the particular volume. All bind segments for that particular volume may be found by traversing a linked list. Second, a list of bind segments that has free slots is used and maintained. Also, the PPRC Bind Segments CB contains a number of bind segments allocated for the volume and a number of total free slots in all the bind segments.

Every cache control block for a track will contain a pointer to a used slot if the track has PPRC modified sector bitmap, otherwise the cache control Block contain an invalid value. The pointer is segment index and offsets within the segment. The slot information contain in the data structure is either used or free. A used slot contains three 16-byte bitmaps for modified sectors and a backward pointer to the cache control block (4 bytes). A free slot does not contain anything.

In association with FIG. 3, in one embodiment, for efficient cache management of multi-target peer-to-peer remote copy (PPRC) modified sectors bitmap, a PPRC modified sector bitmap is set, the PPRC modified sector bitmap is reset after completion of a transfer operation, a query/check operation is performed to determine if the PPRC modified sector bitmap is zero, and/or a cache track may be demoted.

Figure 5:
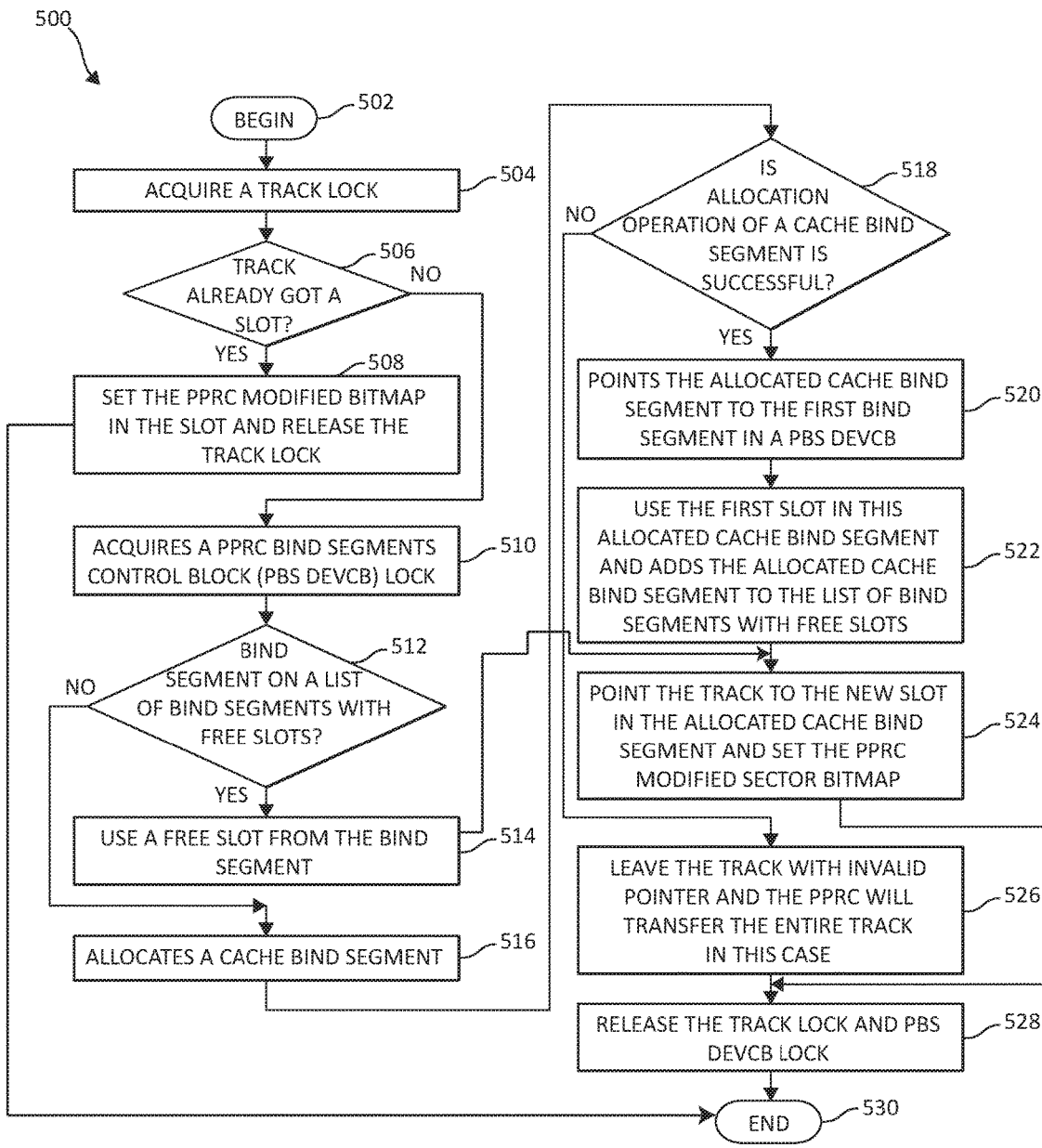
FIG. 5 is a flowchart illustrating an exemplary method for setting a PPRC modified sector bitmap in which aspects of the present invention may be realized.

Turning to FIG. 5, a flowchart illustrating an additional exemplary method 500 for setting a PPRC modified sector bitmap is depicted. The method 500 begins (step 502). The method 500 acquires a track lock (step 504). The method 500 checks if the track has already got a slot (step 506). If the track has a slot, the method 500 sets the PPRC modified bitmap in the slot, and releases the track lock (step 508). From step 508, the method 500 ends (step 530). If the track does not currently have a slot, the method 500 acquires a PPRC Bind Segments Control Block (PBS DevCB) lock (step 510). The method 500 looks (analyzes) at the PBS DevCB to see if there is a bind segment on a list of bind segments with free slots (step 512). If there is a bind segment on a list of bind segments with free slots than the method 500 uses a free slot from the bind segment (step 514). From step 514, the method 500 moves to step 524. If there is no bind segment on the list of bind segments with free slots (e.g., there are no free slots) than the method 500 allocates a cache bind segment (step 516). The method 500 determines if the allocation operation of a cache bind segment is successful (step 518). If the allocation is successful, the method 500 points this allocated cache bind segment to the first bind segment in PBS DevCB (step 520). The method 500 uses the first slot in this allocated cache bind segment and adds the allocated cache bind segment to the list of bind segments with free slots (step 522). The method 500 points the track to the new slot in the allocated cache bind segment and sets the PPRC modified sector bitmap (step 524). If the allocation of a cache bind segment is unsuccessful, the method 500 leaves the track with an invalid pointer (step 526) and the PPRC will transfer the entire track in this case. The method 500 releases the track lock and PBS DevCB lock (step 528). The method 500 ends (step 530).

Figure 6:
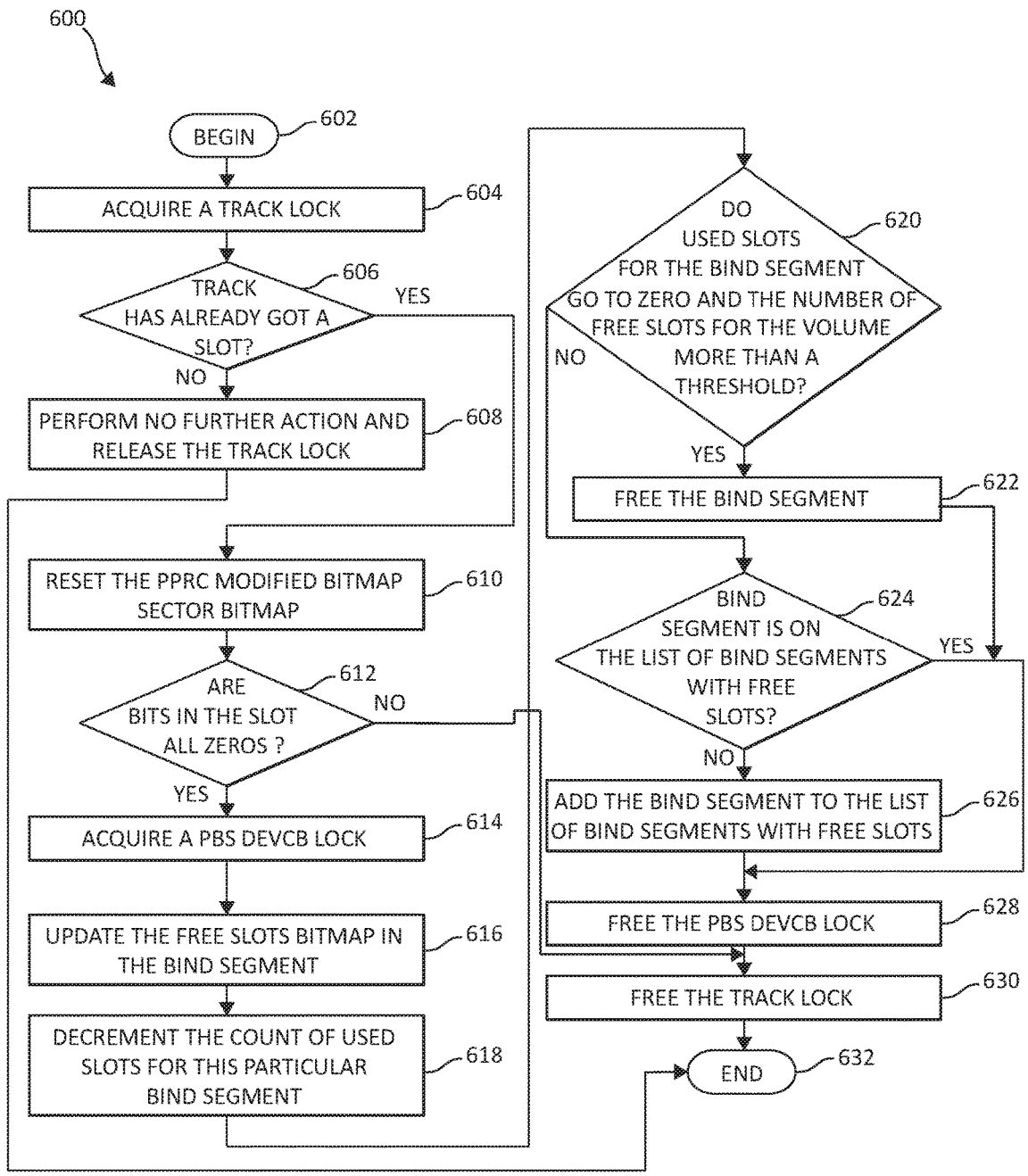
FIG. 6 is a flowchart illustrating an exemplary method for resetting a PPRC modified sector bitmap after completion of a transfer in which aspects of the present invention may be realized.

Turning to FIG. 6, a flowchart illustrating an additional exemplary method 600 for resetting a PPRC modified sector bitmap after completion of a transfer is depicted. The method 600 begins (step 602). The method 600 acquires a track lock (step 604). The method 600 checks if the track has already got a slot (step 606). If the track does not have a slot, the method 600 performs no further action and releases the track lock (step 608). If the track does currently have a slot, the method 600 resets the PPRC modified bitmap sector bitmap (step 610). The method 600 determines if bits in the slot are all zeros (step 612). If no, the method 600 moves to step 630 and frees the track lock (step 630). If the bits are all zeros in the slot, the method 600 acquires a PBS DevCB lock (step 614). The method 600 updates the free slots bitmap in the bind segment (step 616). The method 600 decrements the count of used slots for this particular bind segment (step 618). The method 600 determines if the used slots for the bind segment go to zero and number of free slots for the volume is more than a threshold (step 620). If yes, the method 600 frees the bind segment (step 622). From step 622, the method 600 moves to step 628 and frees the PBS DevCB lock (step 628). If no, the method 600 determines if the bind segment is on the list of bind segments with free slots (step 624). If no, the method 600 then adds the bind segment to the list of bind segments with free slots (step 626). If yes, and also from step 620 and 624, the method 600 frees the PBS DevCB lock (step 628). The method 600 frees the track lock (step 630). The method 600 ends (step 632).

Figure 7:
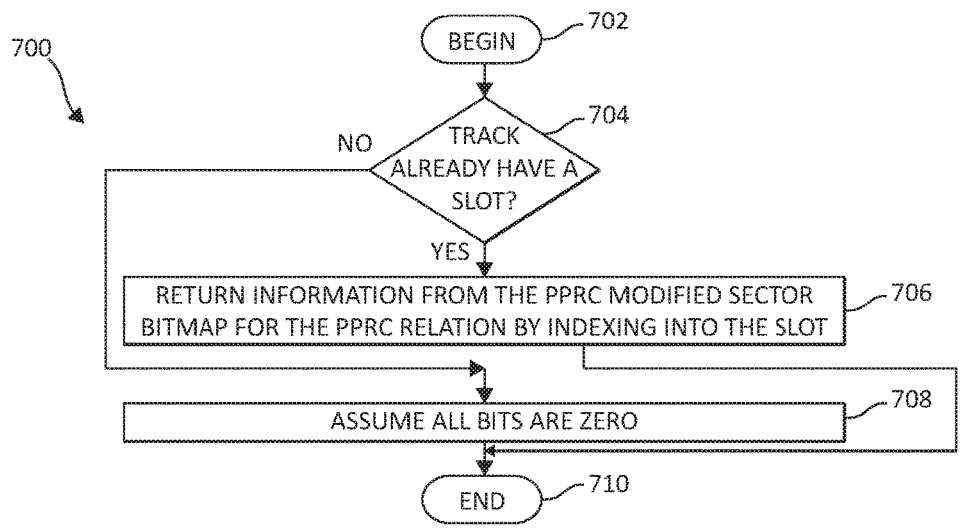
FIG. 7 is a flowchart illustrating an exemplary method for querying/checking if the PPRC modified sector bitmap is zero in which aspects of the present invention may be realized.

Turning to FIG. 7, a flowchart illustrating an additional exemplary method 700 for querying/checking if the PPRC modified sector bitmap is zero is depicted. The method 700 begins (step 702). The method 700 checks/determines if the track already has a slot (step 704). If the track already has a slot, the method 700 returns information from the PPRC modified sector bitmap for the PPRC relationship by indexing into the slot (step 706). From step 706, the method 700 ends (step 710). If no, the method 700 assumes all bits are zero (step 708). The method 700 ends (step 710).

Figure 8:
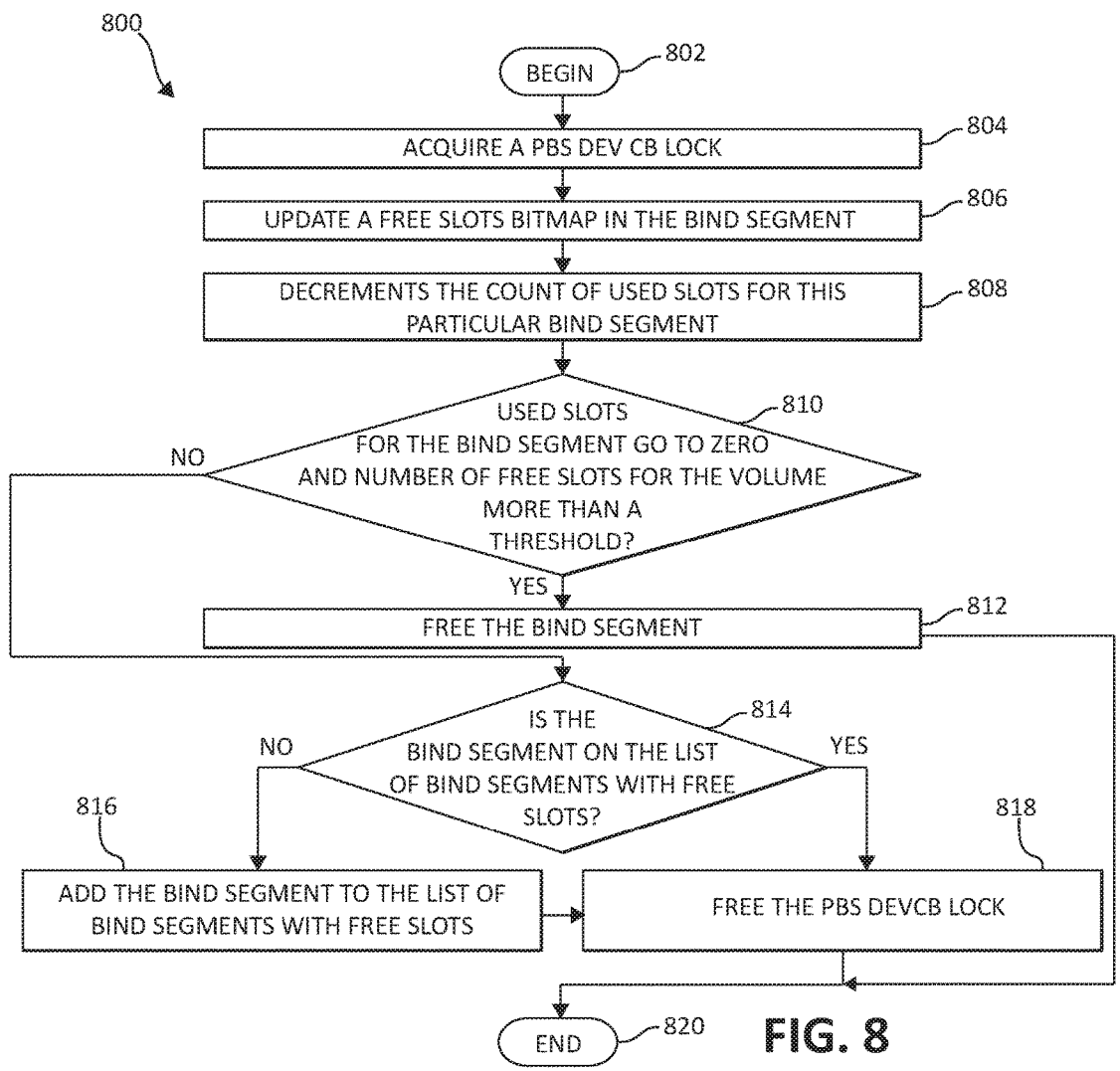
FIG. 8 is a flowchart illustrating an exemplary method for demoting a cache track in which aspects of the present invention may be realized.

Turning to FIG. 8, a flowchart illustrating an additional exemplary method 800 for demoting a cache track is depicted. The method 800 begins (step 802). The method 800 acquires a PBS Dev CB lock (step 804). The method 800 updates a free slots bitmap in the bind segment (step 806). The method 800 decrements the count of used slots for this particular bind segment (step 808). The method 800 determines if the used slots for the bind segment go to zero and number of free slots for the volume is more than a threshold (step 810). If yes, the method 800 frees the bind segment (step 812). If no, the method 800 determines if the bind segment is on the list of bind segments with free slots (step 814). If no, the method 800 then adds the bind segment to the list of bind segments with free slots (step 816). From step 816, the method 800 moves to step 818. If yes (from step 814), the method 800 frees the PBS DevCB lock (step 818). The method 800 ends (step 820).

Figure 9:
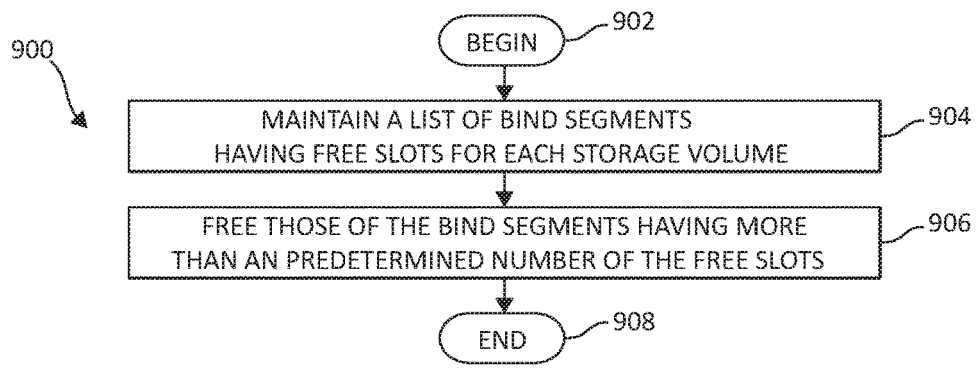
FIG. 9 is a flowchart illustrating an exemplary method for efficient free-space management of multi-target peer-to-peer remote copy (PPRC) modified sectors bitmap in bind segments in which aspects of the present invention may be realized.

In association, and in conjunction with the cache management of multi-target PPRC modified sectors bitmap; free-space of the multi-target PPRC modified sectors bitmap in bind segments is also efficiently managed. Turning to FIG. 9, a flowchart illustrating an additional exemplary method 900 for efficient free-space management of multi-target peer-to-peer remote copy (PPRC) modified sectors bitmap in bind segments is depicted. The method 900 begins (step 902). The method 900 maintains a list of bind segments having free slots for each storage volume (step 904). Each one of the bind segments includes a bitmap of the free slots. The method 900 frees those of the bind segments having more than a predetermined number of the free slots (step 906). The method 900 ends (step 908).

Figure 10:
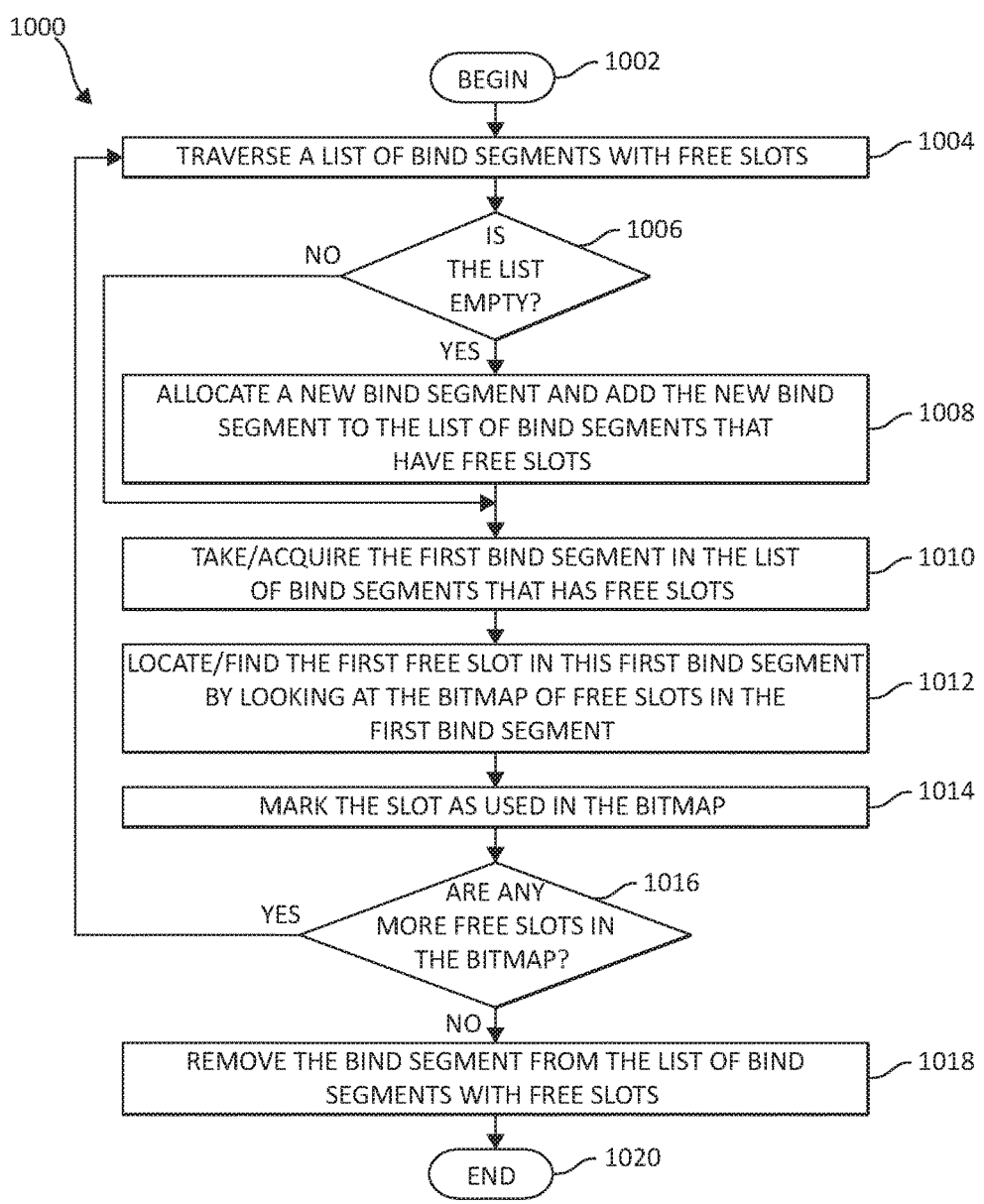
FIG. 10 is a flowchart illustrating an exemplary method for locating/finding a free slot in which aspects of the present invention may be realized.

As mentioned herein, free slots may be both located and freed. A list of bind segments that have free slots is used and maintained. Each bind segment has a bitmap for free slots in the bind segment. Turning to FIG. 10, a flowchart illustrating an additional exemplary method 1000 for locating/finding a free slot is depicted. The method 1000 begins (step 1002). The method 1000 traverses a list of bind segments with free slots (step 1004). The method 1000 determines if the list is empty (step 1006). If the list is empty, the method 1000 allocates a new bind segment and adds the new bind segment to the list of bind segments that have free slots (step 1008). If no and also from step 1008, the method 1000 takes the first bind segment in the list of bind segments that has free slots (step 1010). The method 1000 locates/finds the first free slot in this first bind segment by looking at the bitmap of free slots in the first bind segment (step 1012). The method 1000 marks the slot as used in the bitmap (step 1014). The method 1000 determines if there are any more free slots in the bitmap (step 1016). If no free slots remain/exist in the bitmap, the method 1000 removes the bind segment from the list of bind segments with free slots (step 1018). The method 1000 ends (step 1020).

Figure 11:
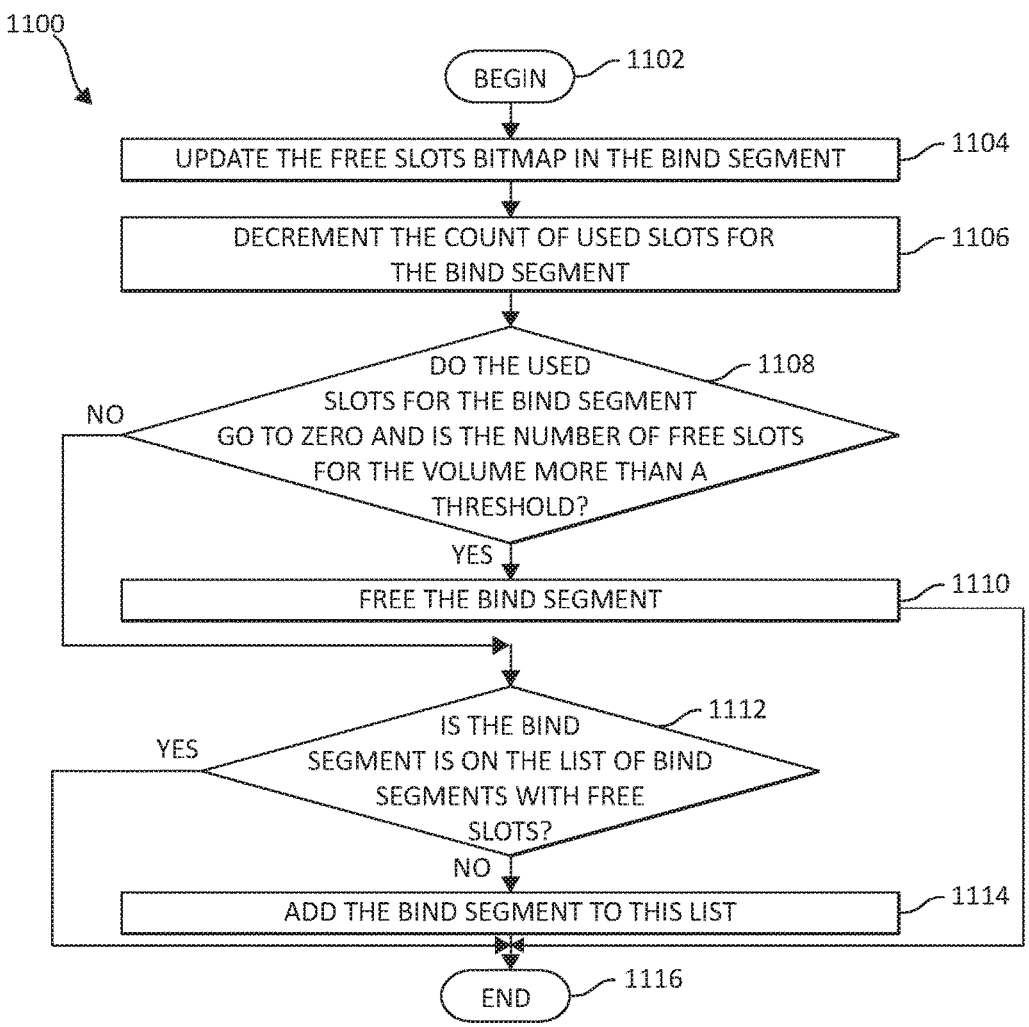
FIG. 11 is a flowchart illustrating an exemplary method for freeing a slot in which aspects of the present invention may be realized.

Turning to FIG. 11, a flowchart illustrating an additional exemplary method 1100 for freeing a slot is depicted. The method 1100 begins (step 1102). The method 1100 updates the free slots bitmap in the bind segment (step 1104). The method 1100 decrements the count of used slots for the bind segment (step 1106). The method 1100 determines if the used slots for the bind segment go to zero and number of free slots for the volume is more than a threshold (e.g., a predetermined threshold/number) (step 1108). If the used slots for the bind segment go to zero and number of free slots for the volume is more than the threshold, the method 1100 frees (e.g., releases) the bind segment (step 1110). From step 1110, the method 1100 ends (step 1116). If no (from step 1108), the method 1100 determines if the bind segment is on the list of bind segments with free slots (step 1112). If yes, the method 1100 ends (step 1116). If the bind segment is not on the list of bind segments with free slots, the method 1110 adds the bind segment to this list (step 1114). The method 1100 ends (step 1116).

Figure 12:
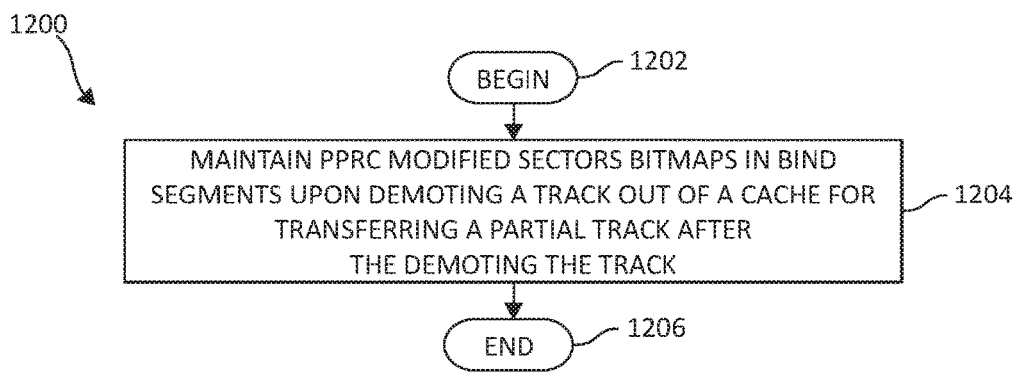
FIG. 12 is a flowchart illustrating an exemplary method for optimizing peer-to-peer remote copy (PPRC) transfers for partial write operations in which aspects of the present invention may be realized.

As mentioned earlier, when a PPRC primary storage system writes a track, the PPRC primary storage system may write the entire track or just some sectors in the track. If the track is demoted before being transferred to the secondary storage system, then the modified sector bitmap is lost. This means that a full track is required to be transferred to the secondary storage system after a track is demoted out of cache. To address this challenge, as described herein, a solution is provided for optimizing peer-to-peer remote copy (PPRC) transfers for partial write operations in a computing storage environment by a processor device. Turning to FIG. 12, a flowchart illustrating an additional exemplary method 1200 for optimizing peer-to-peer remote copy (PPRC) transfers for partial write operations is depicted. The method 1200 begins (step 1202). The method 1200 maintaining a PPRC modified sectors bitmap in bind segments upon demoting a track out of a cache for transferring a partial track after the demoting the track (step 1204). A hash table is used for locating the PPRC modified sectors bitmap. The method 1200 ends (step 1206).

Figure 13:
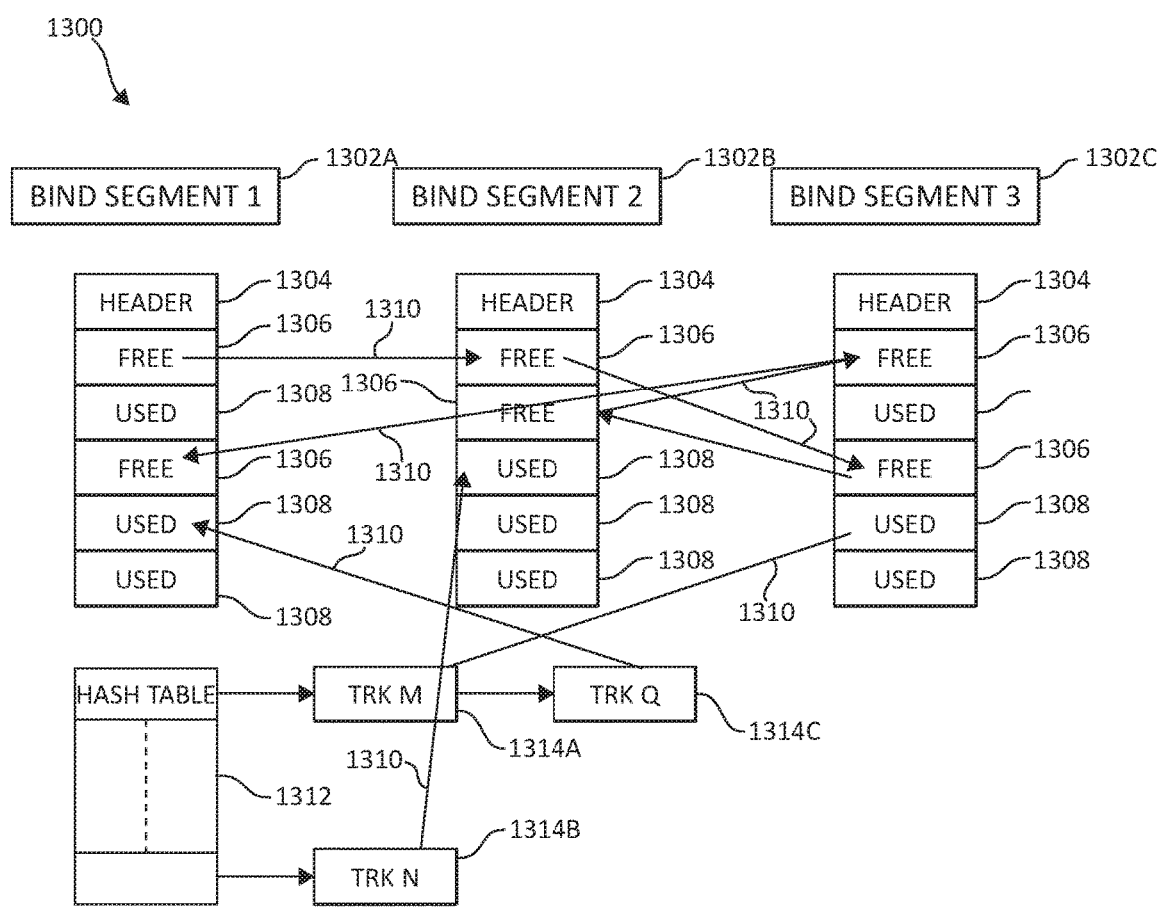
FIG. 13 is a block diagram showing an additional exemplary structure of a linked list of bind segments of free slots in which aspects of the present invention may be realized.

Turning now to FIG. 13, a block diagram 1300 showing an exemplary structure of a linked list of bind segments of free slots is depicted. In one embodiment, cache will use bind segments 1302 (1302A-C) to store PPRC modified sectors bitmap as needed. Each bind segment 1302 has a header 1304 and a certain fixed number of slots 1306 and 1308 (1306 showing the free slots and 1308 showing the used slots) to store PPRC modified sector bitmaps. The slots 1306 and 1308 are grouped together to reduce the overhead of map and unmap of the bind segments 1302.

The header 1304 contains the following information: 1) the number of used slots 1308 for PPRC modified sector bitmaps, 2) a bitmap of free slots 1306, 3) a pointer 1310 to the next and previous bind segment 1302 (e.g., 1302C may be the next bind segment and 1302A may be the previous bind segment as they relate to bind segment 1302B, but this order may also be reversed depending on architectural and/or user preference, 4) a pointer 1310 to the next and previous Bind Segment with free slots, and 5) a longitudinal redundancy check (LRC). FIG. 13 also illustrates a hash table 1312 and tracks 1314 (illustrated in FIG. 13 as 1314A-C for Tracks: Trk M, Trk N, and Trk Q) with pointers 1310 used for pointing the hash table 1312 to the tracks 1314 and/or the tracks to the slots 1306 and 1308.

Figure 14:
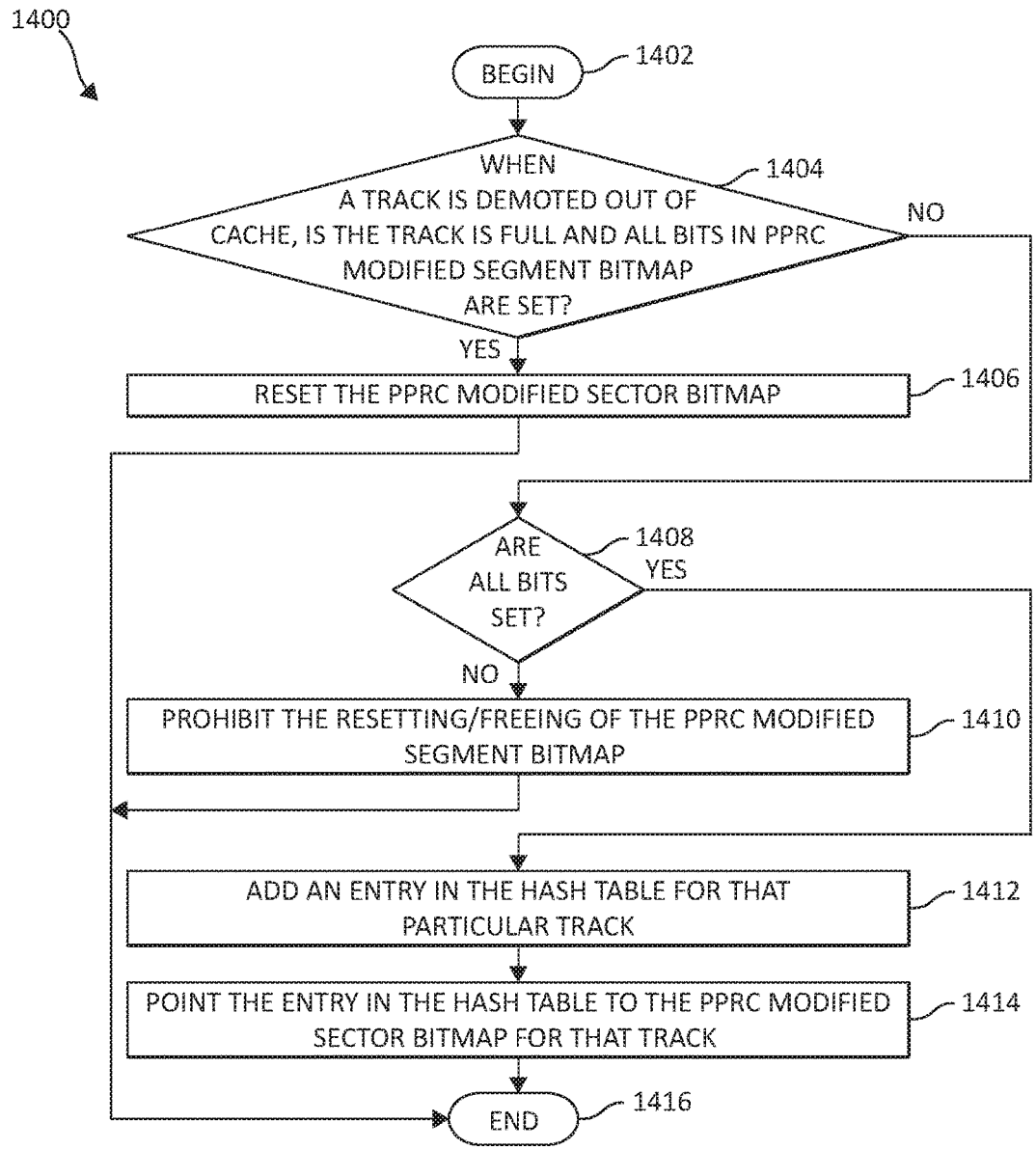
FIG. 14 is a flowchart illustrating an exemplary method for demoting a track in which aspects of the present invention may be realized.

In conjunction with FIG. 13, FIG. 14 is a flowchart illustrating an additional exemplary method 1400 for demoting a track. The method 1400 begins (step 1402). The method 1400 by, when a track is demoted out of cache, the method 1400 determines if the track is full and all bits in PPRC modified segment bitmap are set (step 1404). If yes, method 1400 resets the PPRC modified sector bitmap (step 1406). If no, the method 1400 determines if all bits are set (step 1408). If all of the bits are not set, the method 1400 prohibits the resetting/freeing of the PPRC modified segment bitmap (step 1410). The method 1400 adds an entry in the hash table for that particular track (step 1412). The method 1400 points the entry in the hash table to the PPRC modified sector bitmap for that track (step 1414). The method 1400 ends (step 1416).

Figure 15:
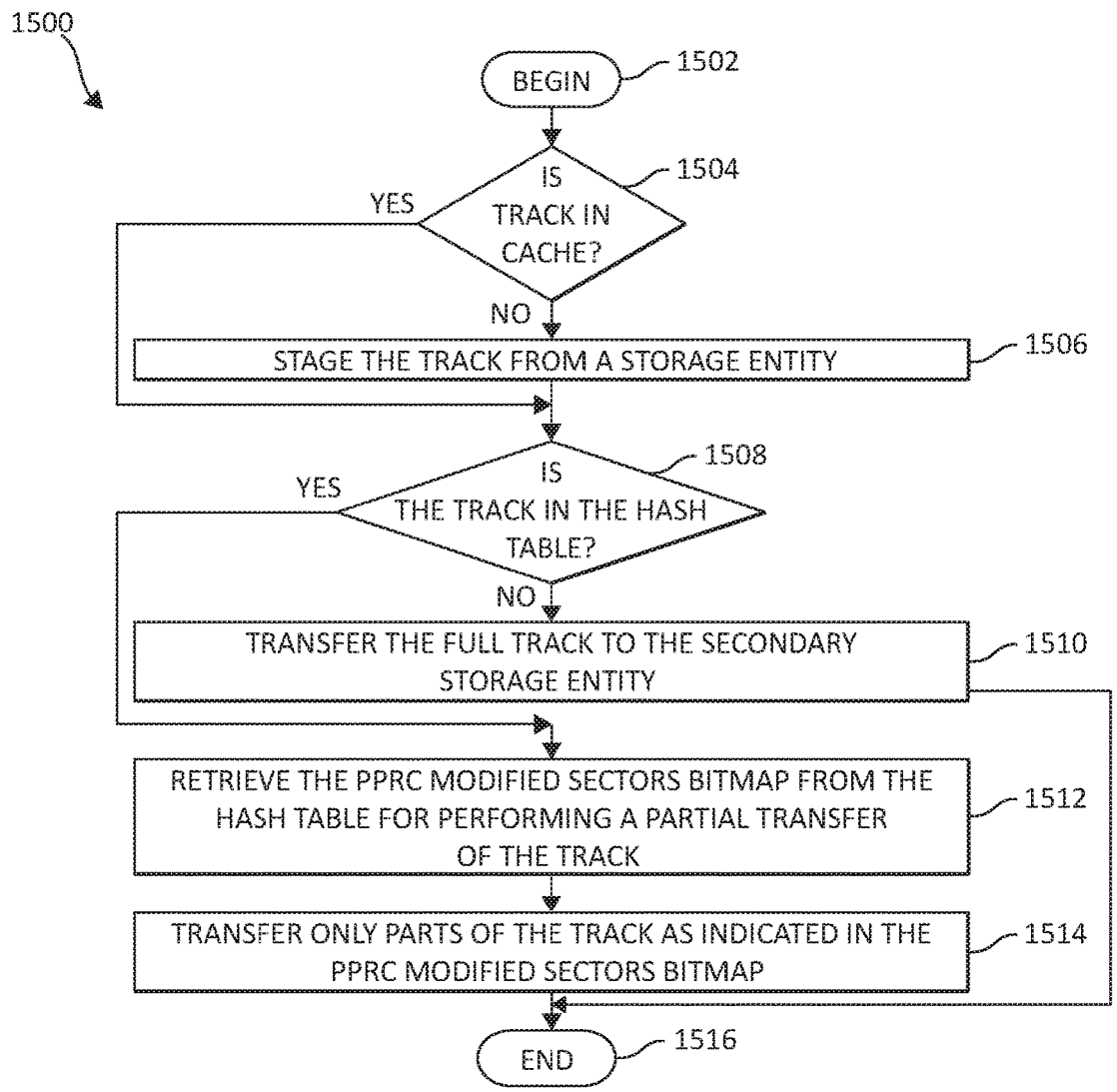
FIG. 15 is illustrating an exemplary method for performing a PPRC partial track transfer operation in which aspects of the present invention may be realized.

Turning to FIG. 15, a flowchart illustrating an additional exemplary method 1500 for a PPRC partial track transfer operation is depicted. The method 1500 begins (step 1502). The method 1500 by determining if the track is or is not in cache (step 1504). If the track is not in cache, the method 1500 stages the track from a storage entity (e.g., a disk) (step 1506). The method 1500 looks up in the hash table to see and determine if the track is in the hash table (step 1508). If the track is not in the hash table, the method 1500 transfers the full track to the secondary storage entity (step 1510). From step 1510, the method 1500 ends (step 1516). If the track is in the hash table (from step 1508), the method 1500 retrieves the PPRC modified sectors bitmap from the hash table for performing a partial transfer of the track (step 1512). The method 1500 transfers only parts of the track as indicated in the PPRC modified sectors bitmap (step 1514). The method 1500 ends (step 1516).

Figure 16:
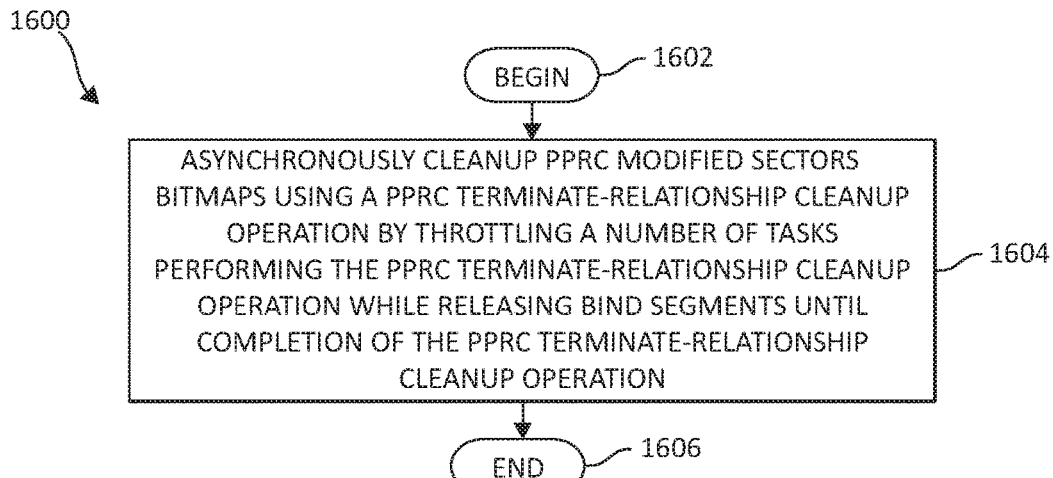
FIG. 16 is a flowchart illustrating an exemplary method for an asynchronous cleanup after a peer-to-peer remote copy (PPRC) terminate relationship operation in which aspects of the present invention may be realized.

When a PPRC relationship is terminated, all the PPRC modified sector bitmaps for the volume corresponding to that relationship need to be cleaned up without holding/delaying the termination operation for several seconds and minimizing the consumption of system resources, particularly when there may be a voluminous amount of termination operations occurring simultaneously. Turning to FIG. 16, a flowchart illustrating an additional exemplary method 1600 an asynchronous cleanup after a peer-to-peer remote copy (PPRC) terminate relationship operation is depicted. The method 1600 begins (step 1602). The method 1600 asynchronously cleaning up a PPRC modified sectors bitmaps using a PPRC terminate-relationship cleanup operation by throttling a number of tasks performing the PPRC terminate-relationship cleanup operation while releasing bind segments (whenever possible) until completion of the PPRC terminate-relationship cleanup operation (step 1604). The method 1600 ends (step 1606).

In one embodiment, there is a queue of termination operation (terminates) (e.g., termination of a PPRC relationship). The terminates are asynchronously processed. The number of tasks doing the processing for the terminates is throttled. The bind segments on the terminates are released whenever possible. PPRC establish-relationship operations (establish) is held until one or more of the terminates is complete.

In one embodiment, on a PPRC terminate, a cache will add a device and relationship to the linked list of terminate cleanup jobs if the PPRC terminate is not already on the list. The cache will change the PPRC relationship for which the PPRC terminate was issued for the required cleanup. If a number of tasks allocated for the terminate cleanup is below a predefined threshold, then a new task is allocated to process the list of terminate clean jobs waiting for the PPRC terminate cleanup.

If a new PPRC establish-relationship operation comes (e.g., dispatched) before the PPRC terminate cleanup has finished then the PPRC establish-relationship operation task will be queued. Once the PPRC terminate cleanup operation is finished, the PPRC establish-relationship operation task will be dispatched.

Figure 17:
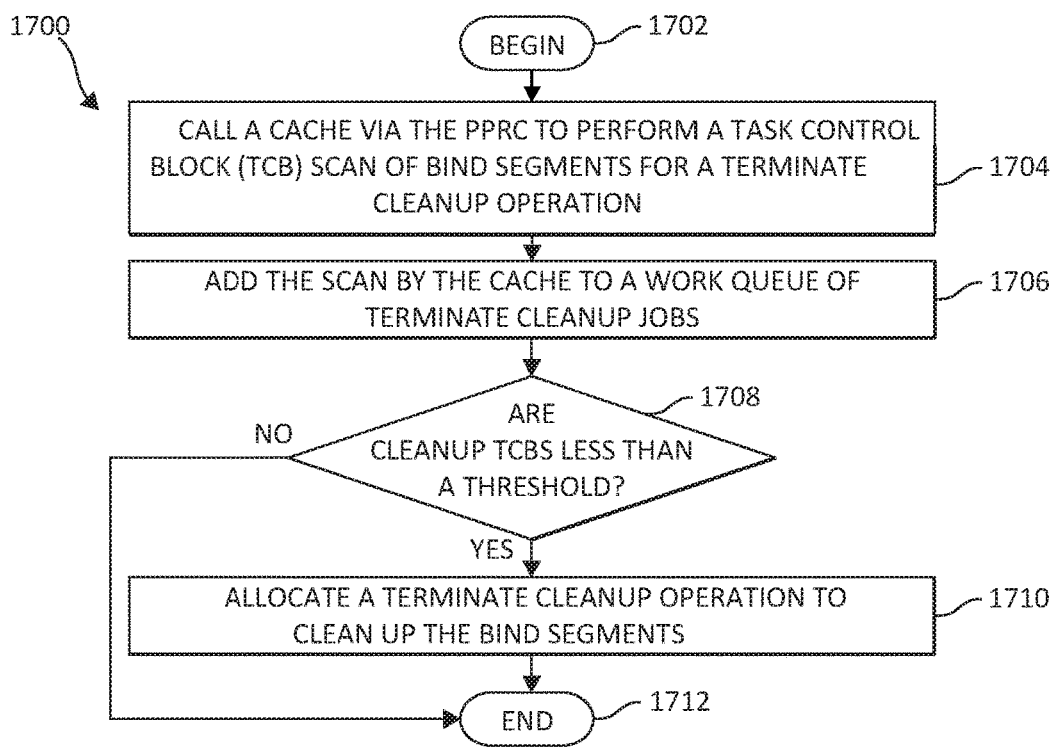
FIG. 17 is a flowchart illustrating an exemplary method for a PPRC terminate-relationship operation in which aspects of the present invention may be realized.

In association with the asynchronous cleanup and other embodiments described herein, a PPRC terminate-relationship operation, a PPRC establish-relationship operation, and a terminate cleanup operation maybe performed. Turning to FIG. 17, a flowchart illustrating an additional exemplary method 1700 for PPRC terminate-relationship operation is depicted. The method 1700 begins (step 1702). The method 1700 calls a cache via the PPRC to perform a TCB scan of bind segments for the terminate cleanup operation (step 1704). The method 1700 adds the scan by the cache to a work queue of terminate cleanup jobs (step 1706). The method 1700 determines if the cache has cleanup TCBs less than a threshold (step 1708). If the cache has a cleanup TCBs less than a threshold, the cache allocates a terminate cleanup to clean up the bind segments (e.g., a task control block task is allocated to perform a terminate cleanup operation) (step 1710). The method 1700 ends (step 1712).

Figure 18:
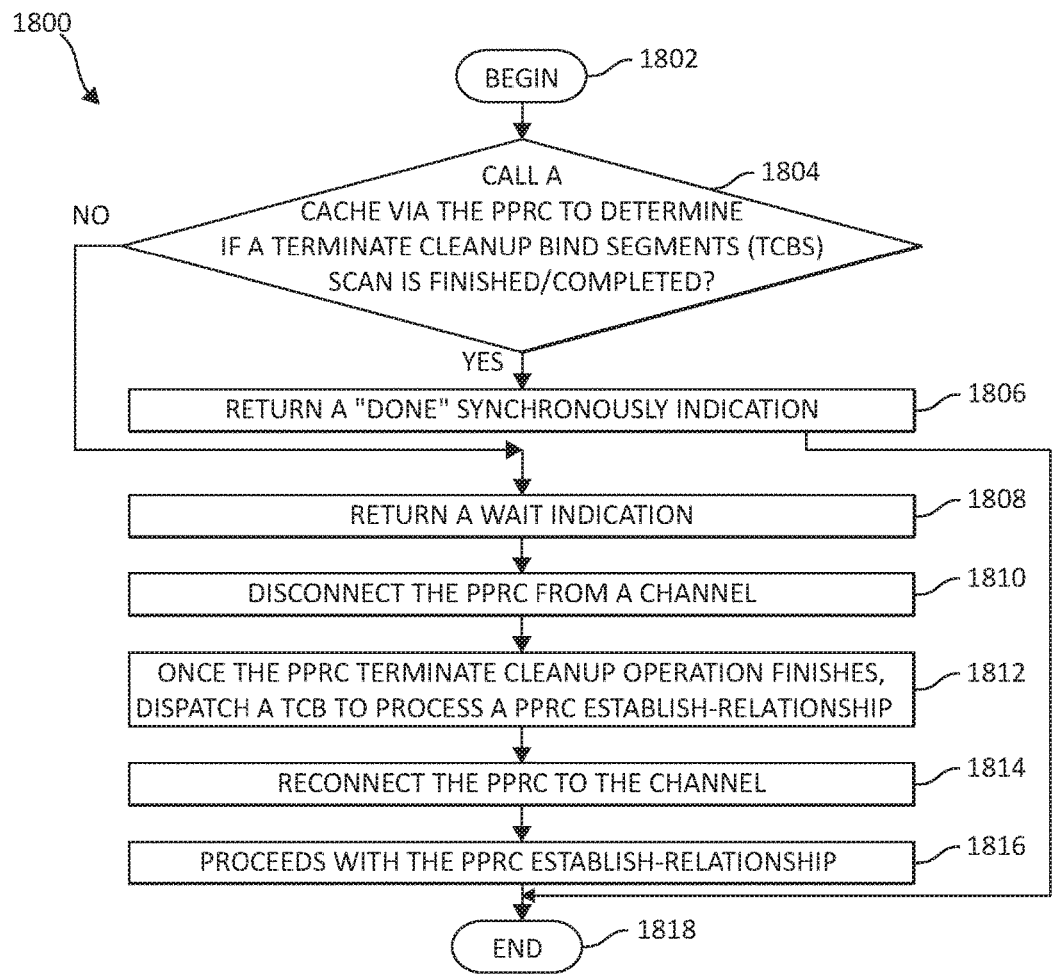
FIG. 18 is a flowchart illustrating an exemplary method for a for PPRC establish-relationship operation in which aspects of the present invention may be realized.

Turning to FIG. 18, a flowchart illustrating an additional exemplary method 1800 for PPRC establish-relationship operation is depicted. The method 1800 begins (step 1802). The method 1800 calls a cache via the PPRC to determine if a terminate cleanup bind segments (TCBs) scan is finished/completed (step 1804). If yes, the cache returns a "done" synchronously indication (step 1806). From step 1806, the method 1800 ends (step 1818). If no (from step 1804), the cache returns a wait indication (step 1808). The storage controller of one of the PPRCs disconnects from a channel (step 1810). Once the PPRC terminate cleanup operation finishes, the cache dispatches a task control block (TCB) to process a PPRC establish relationship operation with a callback (step 1812). The storage controller of one of the PPRCs reconnects to the channel (step 1814). The PPRC proceeds with the PRC establish-relationship (step 1816). The method 1800 ends (step 1818).

Figure 19A:
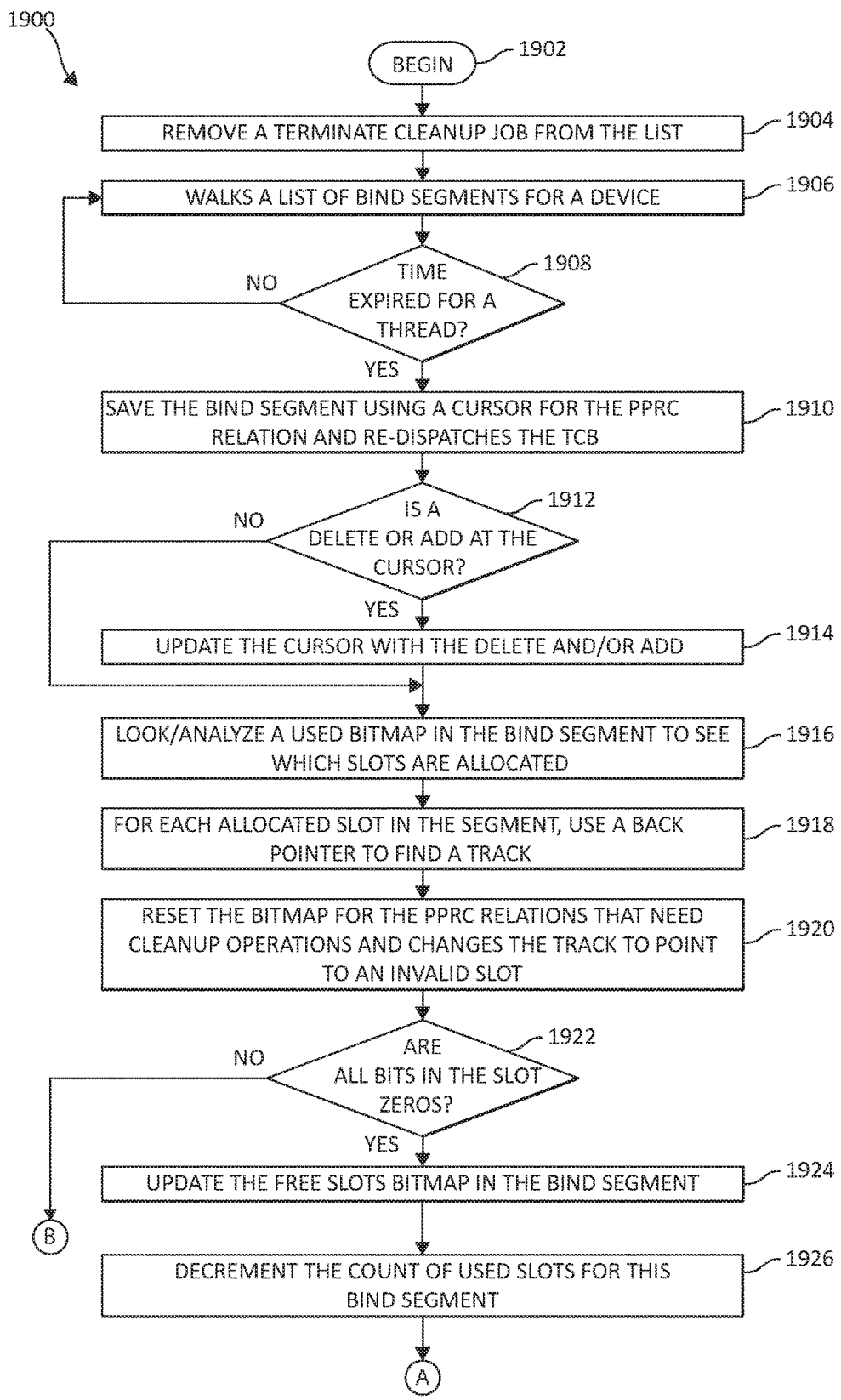
FIG. 19A-B is a flowchart illustrating an exemplary method for issuing a task control block for performing a terminate cleanup operation in which aspects of the present invention may be realized.
Figure 19B:
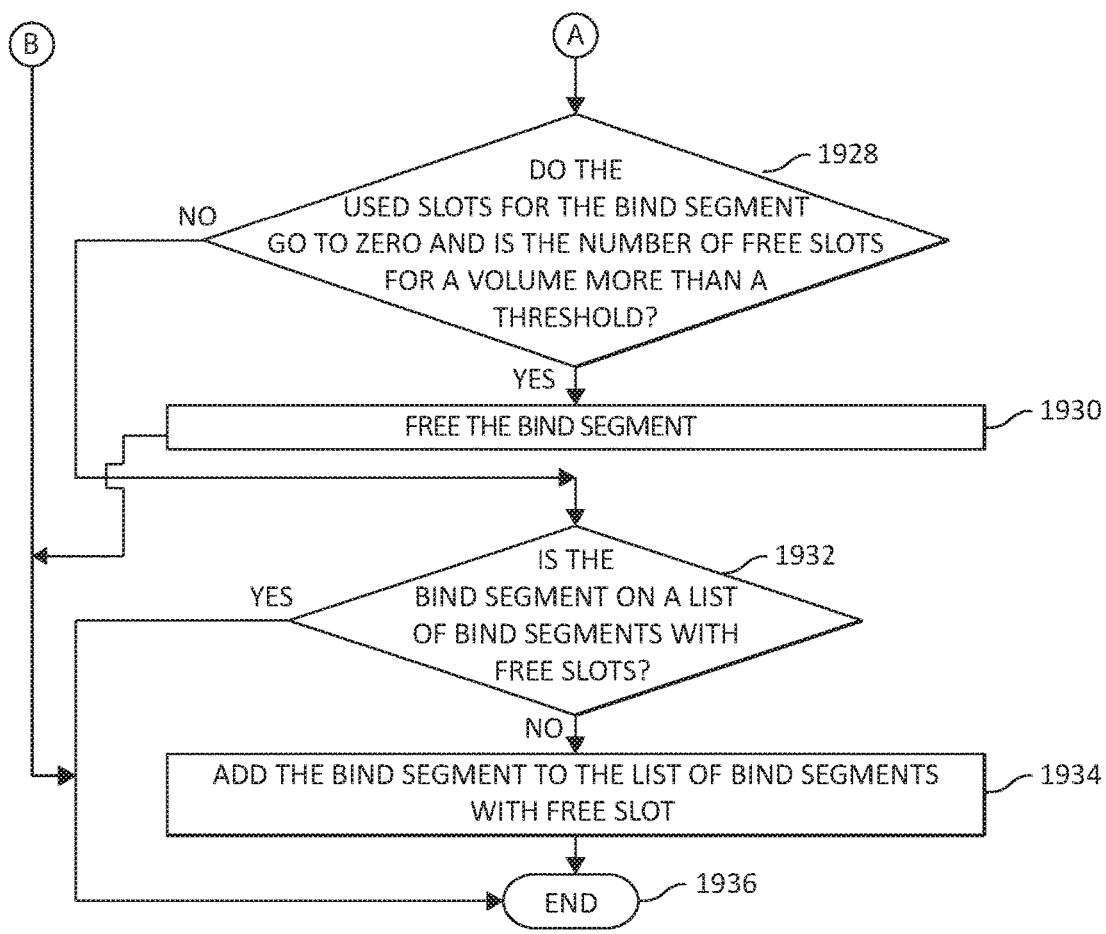

Turning to FIGS. 19A and 19B, a flowchart illustrating an additional exemplary method 1900 for issuing a task control block (TCB) for a terminate clean up operation is depicted. The method 1900 begins (step 1902). The method 1900 removes a terminate cleanup job from the list (step 1904). The method 1900 walks (e.g., traverses) a list of bind segments for a device (step 1906). The method 1900 determines if the time has expired for a thread (e.g., the time may be a predetermined time threshold such as 300 microseconds) (step 1908). If the time has expired for the thread, the method 1900 saves the bind segment using a cursor (e.g., a marker that saves a location of the bind segment) for the PPRC relationship and re-dispatches the TCB (e.g., a TCB is a task or task control block) (step 1910). If no, the method 1900 returns back to step 1906. The method 1900 determines if there is a delete or add at the cursor (step 1912). If there is a delete or add at the cursor, then the delete and/or add will update the cursor (step 1914). The method 1900 looks/analyzes a used bitmap in the bind segment to see which slots are allocated (step 1916). For each allocated slot in the segment, a back pointer is used to find a track (step 1918). The method 1900 resets the bitmap for the PPRC relations that need cleanup operations and changes the track to point to an invalid slot (step 1920). The method 1900 determines if the bits in the slot are all zeros (0) (step 1922). If no, the method 1900 ends (step 1936). If the bits are all zeros in the slot, the method 1900 updates the free slots bitmap in the bind segment (step 1924) and decrements the count of used slots for this bind segment (step 1926). The method 1900 determines if the used slots for the bind segment go to zero and the number of free slots for a volume is more than a threshold (step 1928). If yes, the method 1900 frees the bind segment (step 1930). From step 1930, the method 1900 ends (step 1936). If no (from step 1928), the method 1900 determines if the bind segment is on a list of bind segments with free slots (step 1932). If no, the method 1900 adds the bind segment to the list of bind segments with free slot (step 1934). If yes, the method 1900 ends (step 1936).

In one embodiment, a solution is provided for efficient cache management of multi-target peer-to-peer remote copy (PPRC) modified sectors bitmap in a computing storage environment. In one embodiment, by way of example only, a multiplicity of PPRC modified sectors bitmaps are dynamically managed by placing the multiplicity of PPRC modified sectors bitmaps into slots of bind segments.

In one embodiment, by way of example only, using the bind segments to store the plurality of PPRC modified sectors bitmaps as needed, wherein all of the bind segments have a header and a plurality of slots to store the plurality of PPRC modified sectors bitmaps.

In one embodiment, by way of example only, grouping the plurality of slots for reducing the plurality of PPRC modified sectors bitmaps and unmapping of the bind segments.

In one embodiment, by way of example only, setting one of the plurality of PPRC modified sectors bitmaps in one of the plurality of slots.

In one embodiment, by way of example only, performing at least one of: acquiring a track lock, using a free one of the plurality of slots if there is one of the bind segments in a list of bind segments with the free one of the plurality of slots, wherein if at least one of the bind segments in the list of bind segments does not contain the free one of the plurality of slots, allocating a cache bind segment for setting one of the plurality of PPRC modified sectors bitmaps in one of the plurality of slots, pointing the allocated cache bind segment to a first bind segment in a PPRC bind segments control block included in a storage volume, wherein the PPRC bind segments control block includes at least one of the list of bind segments used for the plurality of PPRC modified sectors bitmaps for the storage volume, a list of bind segments with the available one of the plurality of slots, a pointer to both a previous bind segment and a subsequent bind segment, and a pointer to both a previous bind segment with free slots and a subsequent bind segment with free slots, and using a first slot in the allocated cache bind segment and adding the allocated cache bind segment to the list of bind segments with the free one of the plurality of slots, pointing a track to the first slot in the allocated cache bind segment and setting one of the plurality of PPRC modified sectors bitmaps in the first slot.

In one embodiment, by way of example only, resetting one of the plurality of PPRC modified sectors bitmaps in one of the plurality of slots.

In one embodiment, by way of example only, demoting a track by performing each one of: acquiring a PPRC bind segments control block, updating the plurality of PPRC modified sectors bitmaps having an available one of the plurality of slots in one of the bind segments, decrementing a counter of the plurality of slots that are used for the one of the bind segments, releasing the one of the bind segments if a number of the plurality of slots that are used is zero and a number of the plurality of slots in a storage volume is more than a predetermined threshold, otherwise: adding the one of the bind segments to a list of bind segments with a free one of the plurality of slots, and releasing the PPRC bind segments control block.

In one embodiment, by way of example only, a solution is provided for efficient free-space management of multi-target peer-to-peer remote copy (PPRC) modified sectors bitmap in bind segments in a computing storage environment by a processor device, comprising: maintaining a list of bind segments having a plurality of free slots for each storage volume, wherein each one of the bind segments includes a bitmap of the plurality of free slots; and freeing those of the bind segments having more than an predetermined number of the plurality of free slots.

In one embodiment, by way of example only, performing zeroing out the bitmap for the plurality of free slots and using the bind segments to store a plurality of PPRC modified sectors bitmaps as needed, wherein all of the bind segments have a header and a plurality of free slots to store the plurality of PPRC modified sectors bitmaps.

In one embodiment, by way of example only, grouping the plurality of free slots for reducing the plurality of PPRC modified sectors bitmaps and unmapping of the bind segments.

In one embodiment, by way of example only, locating one of the plurality of free slots, and performing at least one of: traversing a list of the bind segments having at least one of the plurality of free slots, selecting a first bind segment in the list of the bind segments, locating a first free slot in the first bind segment by analyzing the bitmap of the plurality of free slots in one of the bind segments, marking the first free slot as a used slot in the bitmap, and removing one of the bind segments from the list of the bind segments if there are no more of the plurality of free slots.

In one embodiment, by way of example only, freeing one of a plurality of used slots by performing each one of: updating the bitmap for the plurality of free slots in one of the bind segments, decrementing a counter of the plurality of free slots that are used for the one of the bind segments, freeing the one of the bind segments if a number of the plurality of used slots that are used is zero and a number of the plurality of free slots in a storage volume is more than the predetermined number, otherwise: add the one of the bind segments to a list of bind segments.

In one embodiment, by way of example only, a solution is provided for optimizing peer-to-peer remote copy (PPRC) transfers for partial write operations in a computing storage environment by a processor device, comprising: maintaining a PPRC modified sectors bitmap in bind segments upon demoting a track out of a cache for transferring a partial track after the demoting the track, wherein a hash table is used for locating the PPRC modified sectors bitmap.

In one embodiment, by way of example only, resetting the PPRC modified sectors bitmap if the track is full and all bits in the PPRC modified sectors bitmap are set.

In one embodiment, by way of example only, prohibiting the demoting of the track out of the cache if all bits in the PPRC modified sectors bitmap are not set.

In one embodiment, by way of example only, adding an entry in the hash table for the track not demoted out of the cache and pointing the entry in the hash table for the track not demoted out of the cache to the PPRC modified sectors bitmap.

In one embodiment, by way of example only, performing at least one of: staging the track from a storage disk if the track is not located in the cache, and transferring the track in full to a secondary storage device if the track is not located in the hash table.

In one embodiment, by way of example only, retrieving the PPRC modified sectors bitmap from the hash table.

In one embodiment, by way of example only, transferring only portions of the track as indicated in the PPRC modified sectors bitmap upon retrieving the PPRC modified sectors bitmap from the hash table.

In one embodiment, by way of example only, a solution is provided for asynchronous cleanup after a peer-to-peer remote copy (PPRC) terminate relationship operation in a computing storage environment by a processor device, comprising: asynchronously cleaning up a plurality of PPRC modified sectors bitmaps using a PPRC terminate-relationship cleanup operation by throttling a number of tasks performing the PPRC terminate-relationship cleanup operation while releasing a plurality of bind segments until completion of the PPRC terminate-relationship cleanup operation.

In one embodiment, by way of example only, maintaining a list of a plurality of PPRC terminate-relationship cleanup operations, wherein the plurality of PPRC terminate-relationship cleanup operations are queued.

In one embodiment, by way of example only, asynchronously processing the plurality of PPRC terminate-relationship cleanup operations. In one embodiment, by way of example only, terminating a PPRC relationship by performing at least one of: calling a cache to perform a terminate cleanup bind segment scan operation on the plurality of bind segments, adding the terminate cleanup bind segment scan operation to the list of the plurality of PPRC terminate-relationship cleanup operations, and allocating a number of tasks to the list for cleaning at least one of the plurality of bind segments if a number of the tasks are less than a predetermined threshold.

In one embodiment, by way of example only, queuing a new PPRC establish-relationship operation if the new PPRC establish-relationship operation is dispatched prior to completion of one of the plurality of PPRC terminate-relationship cleanup operations.

In one embodiment, by way of example only, dispatching the new PPRC establish-relationship operation upon completion of the one of the plurality of PPRC terminate-relationship cleanup operations.

In one embodiment, by way of example only, terminating one of the plurality of PPRC terminate-relationship cleanup operations by performing at least one of: removing the one of the plurality of PPRC terminate-relationship cleanup operations from the list of the plurality of PPRC terminate-relationship cleanup operations, locating at an unused one of the plurality of PPRC modified sectors bitmaps in a segment for identifying unused slots, using a back pointer to find a track for each allocated slot in the segment, and resetting one of the plurality of PPRC modified sectors bitmaps for a PPRC relationship needing a PPRC terminate-relationship cleanup operation and changing the track to point to an invalid slot in the segment.

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, fieldprogrammable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for asynchronous cleanup after a peer-to-peer remote copy (PPRC) terminate relationship operation in a computing storage environment by a processor device, comprising:
   asynchronously cleaning up a plurality of PPRC modified sectors bitmaps associated with a volume corresponding to a PPRC relationship by throttling a number of tasks performing the cleaning up subsequent to a PPRC terminate-relationship operation; and
   terminating the PPRC relationship by calling a cache to perform a terminate cleanup bind segment scan operation on a plurality of bind segments.

2. The method of claim 1, further including releasing the plurality of bind segments until completion of the cleaning up subsequent to the PPRC terminate-relationship operation, and maintaining a list of a plurality of PPRC terminate-relationship operations, wherein the plurality of PPRC terminate-relationship operations are queued.

3. The method of claim 2, further including asynchronously processing the plurality of PPRC terminate-relationship operations.

4. The method of claim 3, wherein terminating the PPRC relationship further includes performing at least one of:
adding the terminate cleanup bind segment scan operation to the list of the plurality of PPRC terminate-relationship operations, and
allocating a number of tasks to the list for cleaning at least one of the plurality of bind segments if a number of the tasks are less than a predetermined threshold.

5. The method of claim 4, further including queuing a new PPRC establish-relationship operation if the new PPRC establish-relationship operation is dispatched prior to completion of one of the plurality of PPRC terminate-relationship operations.

6. The method of claim 5, further including dispatching the new PPRC establish-relationship operation upon completion of the one of the plurality of PPRC terminate-relationship operations.

7. The method of claim 6, further including terminating the cleaning up subsequent to one of the plurality of PPRC terminate-relationship operations by performing at least one of:
removing the one of the plurality of PPRC terminate-relationship operations from the list of the plurality of PPRC terminate-relationship operations,
locating at an unused one of the plurality of PPRC modified sectors bitmaps in a segment for identifying unused slots,
using a back pointer to find a track for each allocated slot in the segment, and
resetting one of the plurality of PPRC modified sectors bitmaps for a PPRC relationship needing a PPRC terminate-relationship operation and changing the track to point to an invalid slot in the segment.

8. A system for asynchronous cleanup after a peer-to-peer remote copy (PPRC) terminate relationship operation in a computing environment, the system comprising:
at least one processor device operable in the computing environment, wherein processor device:
asynchronously cleans up a plurality of PPRC modified sectors bitmaps associated with a volume corresponding to a PPRC relationship by throttling a number of tasks performing the cleaning up subsequent to a PPRC terminate-relationship operation; and
terminates the PPRC relationship by calling a cache to perform a terminate cleanup bind segment scan operation on a plurality of bind segments.

9. The system of claim 8, wherein the at least one processor device releases the plurality of bind segments until completion of the cleaning up subsequent to the PPRC terminate-relationship operation, and
maintains a list of a plurality of PPRC terminate-relationship operations, wherein the plurality of PPRC terminate-relationship operations are queued.

10. The system of claim 8, wherein the at least one processor device asynchronously processes the plurality of PPRC terminate-relationship operations.

11. The system of claim 10, wherein terminating the PPRC relationship further includes performing at least one of:
adding the terminate cleanup bind segment scan operation to the list of the plurality of PPRC terminate-relationship operations, and
allocating a number of tasks to the list for cleaning at least one of the plurality of bind segments if a number of the tasks are less than a predetermined threshold.

12. The system of claim 11, wherein the at least one processor device queues a new PPRC establish-relationship operation if the new PPRC establish-relationship operation is dispatched prior to completion of one of the plurality of PPRC terminate-relationship operations.

13. The system of claim 12, wherein the at least one processor device dispatches the new PPRC establish-relationship operation upon completion of the one of the plurality of PPRC terminate-relationship operations.

14. The system of claim 13, wherein the at least one processor device terminates the cleaning up subsequent to one of the plurality of PPRC terminate-relationship operations by performing at least one of:
removing the one of the plurality of PPRC terminate-relationship operations from the list of the plurality of PPRC terminate-relationship operations,
locating at an unused one of the plurality of PPRC modified sectors bitmaps in a segment for identifying unused slots,
using a back pointer to find a track for each allocated slot in the segment, and
resetting one of the plurality of PPRC modified sectors bitmaps for a PPRC relationship needing a PPRC terminate-relationship operation and changing the track to point to an invalid slot in the segment.

15. A computer program product for asynchronous cleanup after a peer-to-peer remote copy (PPRC) terminate relationship operation in a computing environment by at least one processor device, the computer program product comprising a non-transitory computer-readable storage medium having computer-readable program code portions stored therein, the computer-readable program code portions comprising:
an executable portion that asynchronously cleans up a plurality of PPRC modified sectors bitmaps associated with a volume corresponding to a PPRC relationship by throttling a number of tasks performing the cleaning up subsequent to a PPRC terminate-relationship operation; and
an executable portion that terminates the PPRC relationship by calling a cache to perform a terminate cleanup bind segment scan operation on a plurality of bind segments.

16. The computer program product of claim 15, further including an executable portion that
releasing a plurality of bind segments until completion of the cleaning up subsequent to the PPRC terminate-relationship operation, and
an executable portion that maintains a list of a plurality of PPRC terminate-relationship operations, wherein the plurality of PPRC terminate-relationship operations are queued.

17. The computer program product of claim 15, further including an executable portion that asynchronously processes the plurality of PPRC terminate-relationship operations.

18. The computer program product of claim 17, wherein terminating the PPRC relationship further includes performing at least one of:

adding the terminate cleanup bind segment scan operation to the list of the plurality of PPRC terminate-relationship operations, and allocating a number of tasks to the list for cleaning at least one of the plurality of bind segments if a number of the tasks are less than a predetermined threshold.

19. The computer program product of claim 18, further including an executable portion that performs at least one of:

queuing a new PPRC establish-relationship operation if the new PPRC establish-relationship operation is dispatched prior to completion of one of the plurality of PPRC terminate-relationship operations, and dispatching the new PPRC establish-relationship operation upon completion of the one of the plurality of PPRC terminate-relationship operations.

20. The computer program product of claim 19, further including an executable portion that terminates the cleaning up subsequent to one of the plurality of PPRC terminate-relationship operations by performing at least one of:

removing the one of the plurality of PPRC terminate-relationship operations from the list of the plurality of PPRC terminate-relationship operations, locating at an unused one of the plurality of PPRC modified sectors bitmaps in a segment for identifying unused slots, using a back pointer to find a track for each allocated slot in the segment, and resetting one of the plurality of PPRC modified sectors bitmaps for a PPRC relationship needing a PPRC terminate-relationship operation and changing the track to point to an invalid slot in the segment.

* * * * *